(12) United States Patent
Takeuchi

(10) Patent No.: US 12,524,742 B2
(45) Date of Patent: Jan. 13, 2026

(54) CONDITION EVALUATION DEVICE, CONDITION EVALUATION METHOD AND COMPUTER READABLE MEDIUM

(71) Applicant: Mitsubishi Electric Corporation, Tokyo (JP)

(72) Inventor: Tomoharu Takeuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 60 days.

(21) Appl. No.: 18/387,662

(22) Filed: Nov. 7, 2023

(65) Prior Publication Data
US 2024/0070621 A1 Feb. 29, 2024

Related U.S. Application Data

(63) Continuation of application No. PCT/JP2021/024385, filed on Jun. 28, 2021.

(51) Int. Cl.
*G06Q 10/20* (2023.01)

(52) U.S. Cl.
CPC .................... *G06Q 10/20* (2013.01)

(58) Field of Classification Search
CPC .................................................. G06Q 10/20
See application file for complete search history.

(56) References Cited

U.S. PATENT DOCUMENTS

| | | | |
|---|---|---|---|
| 10,377,399 B2 * | 8/2019 | Tatsumi | B61L 15/0072 |
| 10,435,050 B2 * | 10/2019 | Nock | B61L 15/0027 |
| 2015/0242822 A1 | 8/2015 | Magara et al. | |
| 2016/0078695 A1 * | 3/2016 | McClintic | G07C 5/0816 701/29.4 |

(Continued)

FOREIGN PATENT DOCUMENTS

| | | |
|---|---|---|
| JP | 2004-191359 A | 7/2004 |
| JP | 2014-85685 A | 5/2014 |

(Continued)

OTHER PUBLICATIONS

Bodnar, Borys et al, Devising a Procedure to Form The Diagnostic Parameters for Locomotives Using a Principal Components Analysis, Apr. 20, 2021, Eastern European Journal of Enterprise Technologies ISSN 1729-3774, Department of Locomotives Dnipro National University of Railway Transport, 2021.*

(Continued)

*Primary Examiner* — John W Hayes
(74) *Attorney, Agent, or Firm* — Birch, Stewart, Kolasch & Birch, LLP

(57) ABSTRACT

A dependence relation database (332) stores dependence relation information (33) wherein a dependence relation between each constituting apparatus among a plurality of constituting apparatuses, and an importance degree to represent intensity of the dependence relation are set, with a vehicle formation (10) being a vertex. An apparatus evaluation unit (302) calculates a soundness estimation value to represent soundness of a terminal constituting apparatus that does not have a constituting apparatus whereon the own constituting apparatus depends among the plurality of constituting apparatuses. A formation evaluation unit (303) acquires the dependence relation information (33), and by using a soundness estimation value of each constituting apparatus among the plurality of constituting apparatuses including the soundness estimation value of the terminal constituting apparatus, and an importance degree of the dependence relation, calculates a soundness estimation value in consideration of the importance degree of the dependence relation of an evaluation target apparatus that is a constituting apparatus being an evaluation target among the plurality of constituting apparatuses, which has a constituting apparatus whereon the own evaluation target apparatus depends.

13 Claims, 14 Drawing Sheets

(56) References Cited

U.S. PATENT DOCUMENTS

| | | | |
|---|---|---|---|
| 2017/0134087 A1* | 5/2017 | Law | H04L 41/0645 |
| 2017/0277566 A1* | 9/2017 | Okamoto | G06F 11/3055 |
| 2017/0369084 A1 | 12/2017 | Goda et al. | |
| 2019/0176859 A1* | 6/2019 | Shibasaki | B61L 15/0081 |
| 2019/0232987 A1 | 8/2019 | Yamada et al. | |
| 2020/0150639 A1 | 5/2020 | Muto | |
| 2021/0107539 A1* | 4/2021 | Howard | G06F 18/241 |
| 2021/0316771 A1 | 10/2021 | Takeuchi et al. | |
| 2021/0323588 A1 | 10/2021 | Ando et al. | |
| 2022/0017128 A1 | 1/2022 | Kojima et al. | |
| 2022/0032979 A1* | 2/2022 | Sivalingam | B61L 27/50 |
| 2022/0189214 A1* | 6/2022 | Bayoudh | B61L 27/57 |
| 2023/0117073 A1* | 4/2023 | Wakimoto | B61L 27/57 701/29.4 |

FOREIGN PATENT DOCUMENTS

| | | |
|---|---|---|
| JP | 6414667 B2 | 10/2018 |
| JP | 2019-121052 A | 7/2019 |
| JP | 2020-77296 A | 5/2020 |
| JP | 2020-87013 A | 6/2020 |
| WO | WO 2012/157040 A1 | 11/2012 |
| WO | WO 2016/117025 A1 | 7/2016 |
| WO | WO 2018/029799 A1 | 2/2018 |
| WO | WO 2018/138923 A1 | 8/2018 |
| WO | WO 2020/049739 A1 | 3/2020 |
| WO | WO 2020/121490 A1 | 6/2020 |
| WO | WO 2020/148876 A1 | 7/2020 |

OTHER PUBLICATIONS

Biukaye Boubacar Traore et al., Service-Oriented Computing for Intelligent Train Maintenance, Jul. 15, 2018, Enterprise Information Systems, 2019, vol. 13, No. 1, 63-86.*

International Search Report (PCT/ISA/210) issued in PCT/JP2021/024385, dated Sep. 14, 2021.

* cited by examiner

… (1)

CONDITION EVALUATION DEVICE, CONDITION EVALUATION METHOD AND COMPUTER READABLE MEDIUM

CROSS REFERENCE TO RELATED APPLICATIONS

This application is a Continuation of PCT International Application No. PCT/JP2021/024385, filed on Jun. 28, 2021, which is hereby expressly incorporated by reference into the present application.

TECHNICAL FIELD

The present disclosure relates to a soundness evaluation device, a soundness evaluation method and a soundness evaluation program. Especially, the present disclosure relates to a soundness evaluation system, a soundness evaluation device, a soundness evaluation method and a soundness evaluation program to evaluate the soundness related to a railroad vehicle.

BACKGROUND ART

Regarding schedule planning and implementation thereof of railroad maintenance, TBM (time based maintenance) has been recently being shifted to CBM (condition based maintenance). Shifting of railroad maintenance to CBM is beneficial for solving problems such as cost increase due to excessive maintenance work, and risk of developing defect at timing other than the maintenance timing.

In a railroad enterprise, operation management including operation timetable management is performed using vehicle formation wherein a plurality of vehicles are connected as an operation unit. The vehicle formation is an assembly of a plurality of vehicles and a plurality of apparatuses. Accordingly, when one apparatus inside a vehicle breaks down, operation of the whole vehicle formation is stopped. Therefore, in railroad maintenance as well, maintenance schedules are made using a vehicle formation as one maintenance unit. Thus, in order to make a maintenance schedule, and further to optimize the maintenance schedule, it is necessary to evaluate the soundness of vehicle formation in units of vehicle formations.

For example, in Patent Literature 1, from passenger load data, operation load data and weather load data acquired from each apparatus constituting a vehicle formation, a travelling distance and various load factors are obtained, and a total load factor for each apparatus is derived. Additionally, a method to obtain the number of days until when maintenance is required based on information such as a threshold value, and the number of days elapsed from the last maintenance is disclosed. This makes it possible to estimate a degree of damage or deterioration of vehicles and suppress unnecessary inspection and excessive maintenance work, to reduce the maintenance fee, and to suppress a risk of developing defects and damages.

CITATION LIST

Patent Literature

Patent Literature 1: JP 6414667 B

SUMMARY OF INVENTION

Technical Problem

The method according to Patent Literature 1 is a method to calculate a load factor for each apparatus, and to estimate deterioration. Thus, in Patent Literature 1, in order to perform maintenance planning in units of vehicle formations, it is necessary to estimate soundness of the vehicle formation based on a soundness evaluation result of each apparatus, and to reflect the soundness of the vehicle formation on a maintenance plan or an operation plan by a maintenance person. The maintenance person is a railroad business personnel or a maintenance worker. Further, in Patent Literature 1, it is difficult to perform advanced status analysis in consideration of relations between apparatuses in the vehicle formation.

As described, in the conventional techniques, as for soundness evaluation of each individual apparatus, various methods have been started to be considered, and performed. Meanwhile, there has been a problem that it is impossible to perform soundness evaluation in units of vehicle formations, especially integrated soundness evaluation in consideration of the importance of each apparatus.

The present disclosure is aimed at performing highly accurate evaluation of soundness in units of vehicle formations in consideration of importance of constituting apparatuses.

Solution to Problem

There is provided according to one aspect of the present invention a soundness evaluation device to evaluate a soundness of a vehicle formation that is constituted by a plurality of constituting apparatuses, the soundness evaluation device includes:

an apparatus evaluation unit to calculate a soundness estimation value to represent a soundness with respect to a terminal constituting apparatus which does not have a constituting apparatus whereon the terminal constituting apparatus itself depends, among the plurality of constituting apparatuses, and a formation evaluation unit to acquire dependence relation information from a dependence relation database to store the dependence relation information wherein a dependence relation between each constituting apparatus among the plurality of constituting apparatuses and an importance degree to represent intensity of the dependence relation are set, with the vehicle formation being a vertex, and by using a soundness estimation value of each constituting apparatus among the plurality of constituting apparatuses, including the soundness estimation value of the terminal constituting apparatus, and the importance degree of the dependence relation, to calculate a soundness estimation value in consideration of the importance degree of the dependence relation with respect to an evaluation target apparatus that is a constituting apparatus being an evaluation target among the plurality of constituting apparatuses, the evaluation target apparatus having a constituting apparatus whereon the evaluation target apparatus itself depends.

Advantageous Effects of Invention

In a soundness evaluation device according to the present disclosure, a dependence relation database stores dependence relation information wherein dependence relations between each constituting apparatus among a plurality of constituting apparatuses, and importance degrees of the dependence relations are set, with a vehicle formation being a vertex. A formation evaluation unit calculates a soundness estimation value in consideration of the importance degrees of the dependence relations with respect to an evaluation target apparatus for which a constituting apparatus whereon it depends exists, using a soundness estimation value of each constituting apparatus among a plurality of constituting apparatuses, and the importance degrees of the dependence relations. Accordingly, the soundness evaluation device according to the present disclosure has an effect that it is possible to perform highly accurate soundness evaluation in consideration of the importance of the constituting apparatuses in units of vehicle formations, by using information on dependence relations and a soundness estimation value of each constituting apparatus among a plurality of constituting apparatuses.

DESCRIPTION OF EMBODIMENTS

Figure 1:
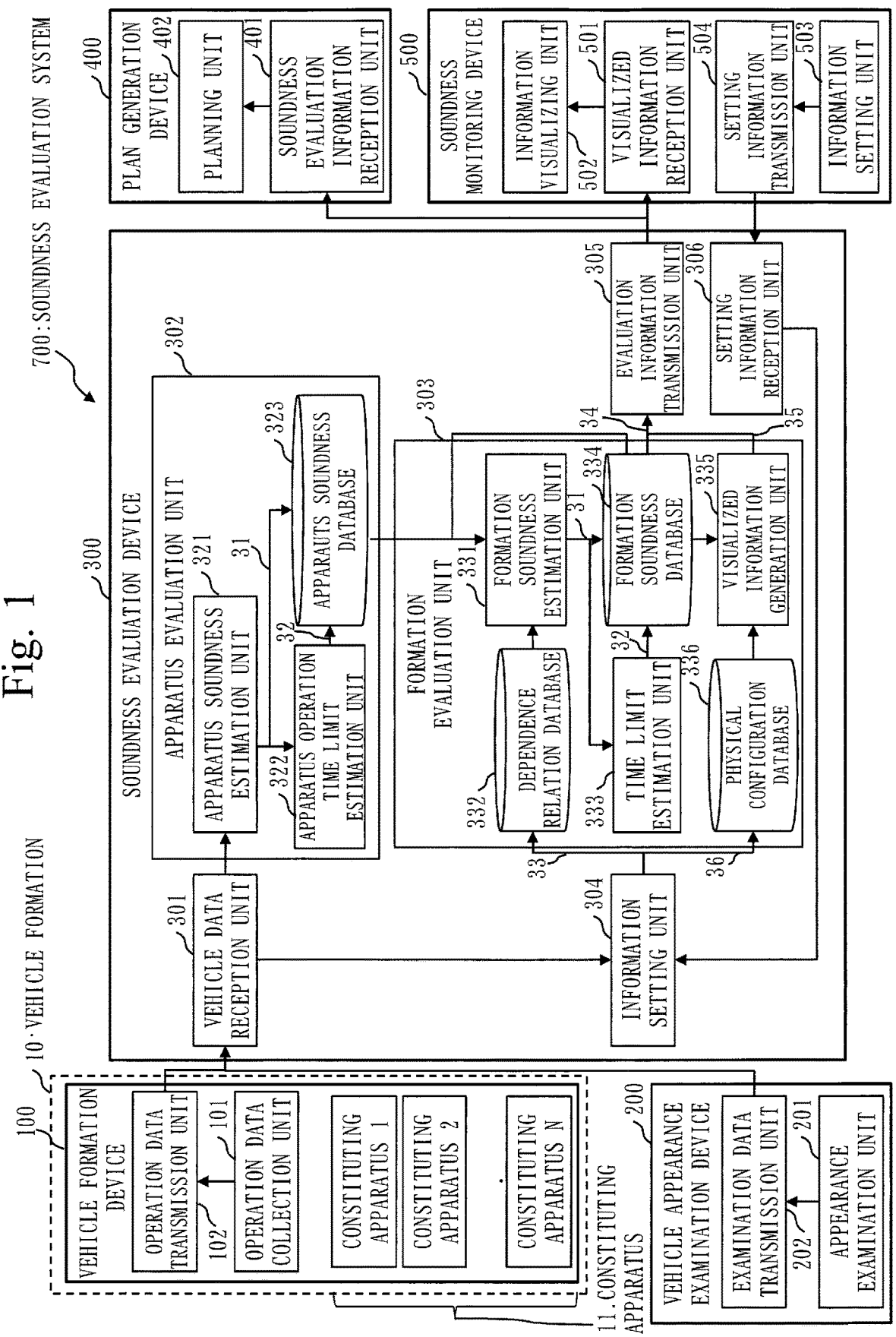
FIG. 1 is a diagram illustrating a configuration example of a soundness evaluation system according to a first embodiment.

Hereinafter, description will be made on present embodiments with reference to diagrams. In each diagram, same elements or corresponding elements are denoted by same reference numerals. In the explanation of the embodiments, description of the same or the corresponding elements is omitted or simplified appropriately. Further, in the following diagrams, the relation between sizes of each constituent member may differ from that of actual members. Furthermore, in the explanation of the embodiments, directions or positions such as above, below, left, right, front, back, obverse and reverse may be indicated. These indications are description applied for ease of explanation, which does not limit the positions, directions and orientations of devices, instruments and parts, etc.

First Embodiment

*Explanation of Configuration*

FIG. 1 is a diagram illustrating a configuration example of a soundness evaluation system 700 according to a present embodiment.

The soundness evaluation system 700 is a system to evaluate soundness of a vehicle formation 10 constituted by a plurality of constituting apparatuses 11.

The soundness evaluation system 700 is constituted by a vehicle formation deice 100, a vehicle appearance examination device 200, a soundness evaluation device 300, a plan generation device 400 and a soundness monitoring device 500.

Hereinafter, brief description will be made on a function of each functional element included in each device of the soundness evaluation system 700.

The vehicle formation device 100 is an in-vehicle device mounted on the vehicle formation 10 to be a target of evaluation. The vehicle formation 10 is, for example, a railroad vehicle formation. The vehicle formation device 100 may be called a railroad vehicle formation.

The vehicle appearance examination device 200 examines an external state of each unit in the vehicle formation 10 being the evaluation target.

The soundness evaluation device 300 performs soundness evaluation of the vehicle formation 10. The soundness evaluation device 300 may be also called a soundness evaluation server. The soundness evaluation device 300 is a device to evaluate soundness of the vehicle formation 10 constituted by the plurality of constituting apparatuses 11.

The plan generation device 400 calculates a plan such as a maintenance plan and an operation plan using soundness evaluation information 34 of the vehicle formation 10 calculated by the soundness evaluation device 300. The plan generation device 400 is also called a maintenance/operation plan server.

The soundness monitoring device 500 sets or changes a variety of definition information such as dependence relation information 33 of an apparatus or physical configuration information 36 of an apparatus used for soundness evaluation. Further, the soundness monitoring device 500 confirms or monitors the soundness evaluation information 34 calculated by the soundness evaluation device 300. The soundness monitoring device 500 is also called an information definition/soundness monitoring device.

In the vehicle formation device 100, the vehicle formation 10 is configured as an assembly of N-pieces of constituting apparatuses 11. The vehicle formation device 100 includes an operation data collection unit 101 and an operation data transmission unit 102. The operation data collection unit 101 acquires status data in operation from each constituting apparatus as apparatus operation data. The operation data collection unit 101 is also called an apparatus operation data collection processing unit. The operation data transmission unit 102 transmits the apparatus operation data to the soundness evaluation device 300. The operation data transmission unit 102 is also called an apparatus operation data transmission unit.

The vehicle appearance examination device 200 includes an appearance examination unit 201 to examine a state of each unit from the appearance of the vehicle formation 10 being the evaluation target, and an examination data transmission unit 202 to transmit the appearance examination data being result data of examination by the appearance examination unit 201 to the soundness evaluation device 300.

The soundness evaluation device 300 includes a vehicle data reception unit 301, an apparatus evaluation unit 302, a formation evaluation unit 303, an information setting unit 304, an evaluation information transmission unit 305 and a setting information reception unit 306.

The vehicle data reception unit 301 receives the apparatus operation data, dependence relations of apparatuses, and physical configuration information transmitted from the vehicle formation device 100. Further, the vehicle data reception unit 301 receives the appearance examination data transmitted from the vehicle appearance examination device 200.

The apparatus evaluation unit 302 evaluates soundness for each constituting apparatus in the vehicle formation 10. Especially, the apparatus evaluation unit 302 evaluates soundness for a terminal constituting apparatus for which a constituting apparatus whereon the own constituting apparatus depends does not exist in the plurality of constituting apparatuses 11. The apparatus evaluation unit 302 is also called an apparatus evaluation unit.

The formation evaluation unit 303 evaluates soundness in the vehicle formation using the soundness evaluation information with respect to the constituting apparatuses 11. The formation evaluation unit 303 is also called a vehicle formation soundness evaluation unit.

The information setting unit 304 generates various types of definition information such as dependence relation information 33 of constituting apparatuses 11 necessary for soundness evaluation for the vehicle formation 10, and physical configuration information 36 of the constituting apparatuses 11. The information setting unit 304 stores the dependence relation information 33 in a dependence relation database 332, and the physical configuration information 36 in a physical configuration database 336.

The evaluation information transmission unit 305 transmits the soundness evaluation information 34 calculated by the formation evaluation unit 303 to the plan generation deice 400 and the soundness monitoring device 500. The evaluation information transmission unit 305 is also called a soundness evaluation information transmission unit.

The setting information reception unit 306 receives the various types of definition information set in the soundness monitoring device 500.

Further, the apparatus evaluation unit 302 includes an apparatus soundness estimation unit 321, an apparatus operation time limit estimation unit 322 and an apparatus soundness database 323.

The apparatus soundness estimation unit 321 estimates soundness with respect to the constituting apparatuses 11 of the vehicle formation 10 as a soundness estimation value 31.

The apparatus operation time limit estimation unit 322 estimates an operation time limit 32 of the constituting apparatus from the soundness estimation value 31.

The apparatus soundness database 323 stores the soundness estimation value 31 and the operation time limit 32 estimated.

The formation evaluation unit 303 includes a formation soundness estimation unit 331, the dependence relation database 332, a time limit estimation unit 333, a formation soundness database 334, a visualized information generation unit 335 and the physical configuration database 336.

The formation soundness estimation unit 331 estimates the soundness estimation value 31 in the vehicle formation 10 based on the soundness estimation value in the constituting apparatuses 11 of the vehicle formation 10.

The dependence relation database 332 stores the dependence relation information 33 of the constituting apparatuses 11 necessary for estimation of soundness with respect to the vehicle formation 10.

The time limit estimation unit 333 estimates the operation time limit 32 of the vehicle formation 10 from the soundness estimation value 31 in the vehicle formation 10.

The formation soundness database 334 stores the soundness estimation value 31 of the vehicle formation 10 estimated and the operation time limit 32 of the vehicle formation 10.

The information including the soundness estimation value 31 and the operation time limit 32 shall be soundness evaluation information 34.

The visualized information generation unit 335 generates visualized information 35 for visualizing the soundness estimation value 31 of the vehicle formation 10 and the operation time limit 32 of the vehicle formation 10.

The physical configuration database 336 stores the physical configuration information 36 of an apparatus necessary for generation of the visualized information 35.

The plan generation device 400 includes a soundness evaluation information reception unit 401 to receive the soundness evaluation information 34 of the vehicle formation 10 calculated by the soundness evaluation device 300, and a planning unit 402 to make a maintenance plan or an operation plan of the vehicle formation 10 based on the soundness evaluation information 34 received.

The soundness monitoring device 500 includes a visualized information reception unit 501, an information visualizing unit 502, an information setting unit 503 and a setting information transmission unit 504.

The visualized information reception unit 501 receives visualized information 35 to visualize the soundness evaluation information 34 of the vehicle formation 10 calculated by the soundness evaluation device 300. The visualized information reception unit 501 is also called a soundness visualized information reception unit.

The information visualizing unit 502 visualizes the soundness evaluation information 34 received.

The information setting unit 503 sets various kinds of definition information such as the dependence relation information 33 of the constituting apparatuses used for soundness evaluation, or the physical configuration information 36 of the constituting apparatuses. The information setting unit 503 is also called a physical configuration/dependence relation information setting unit.

The setting information transmission unit 504 transmits the various kinds of definition information such as the dependence relation information 33 of the constituting apparatuses or the physical configuration information 36 of the constituting apparatuses set.

Figure 2:
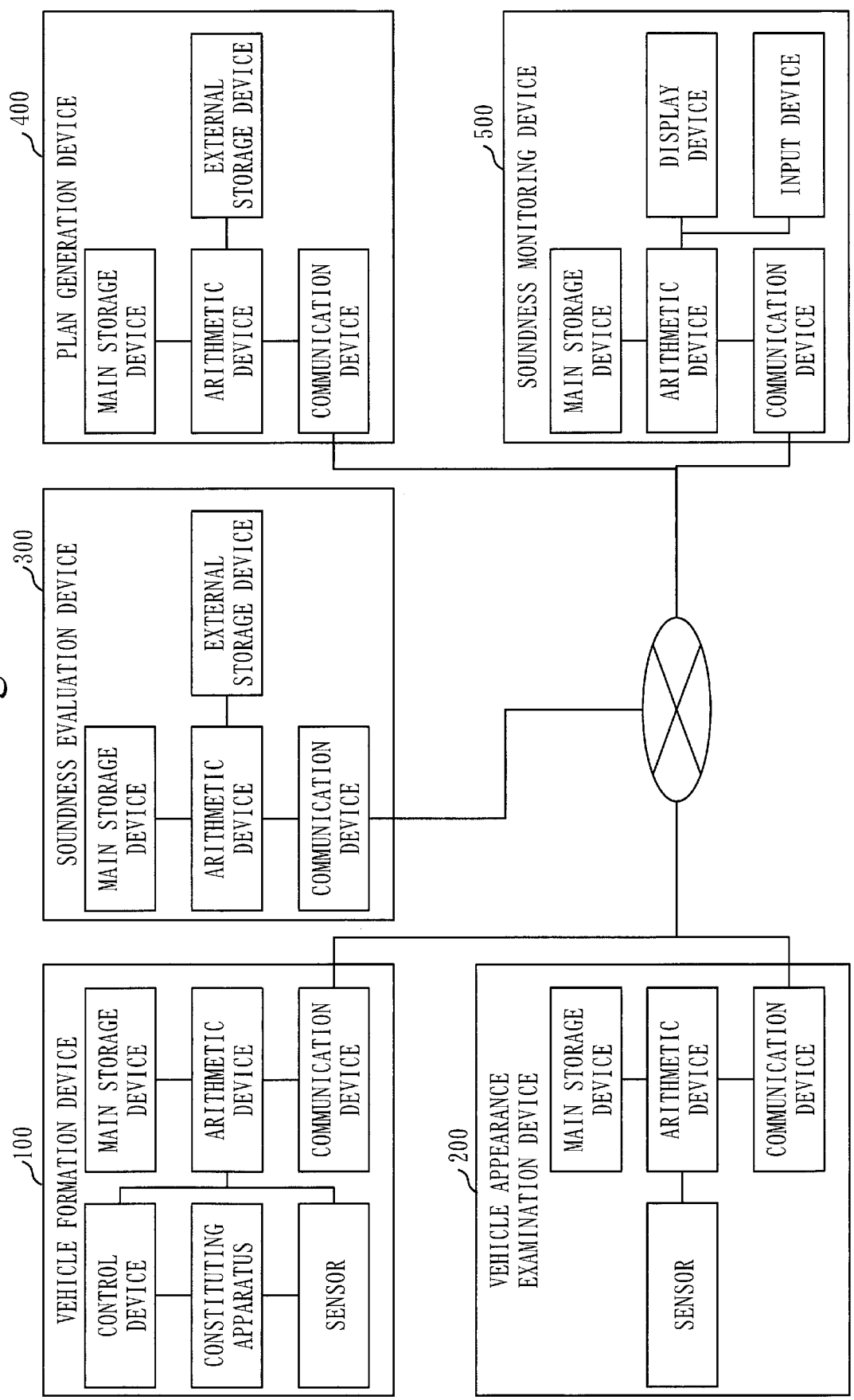
FIG. 2 is a diagram illustrating an example of a hardware configuration of the soundness evaluation system according to the first embodiment.

FIG. 2 is a diagram illustrating an example of a hardware configuration of the soundness evaluation system 700 according to the present embodiment.

The hardware configuration of the soundness evaluation system 700 is constituted by the vehicle formation device 100, the vehicle appearance examination device 200, the soundness evaluation device 300, the plan generation device 400 and the soundness monitoring device 500. Each device of the soundness evaluation system 700 communicates via a network.

The soundness evaluation device 300 and the plan generation device 400 may be an on-premise server, or may be a server configured on a cloud.

The vehicle formation device 100 includes constituting apparatuses that constitute a vehicle formation being an evaluation target, a control device to control operations of each constituting apparatus and a sensor to sense an operation state of each constituting apparatus. Further, the vehicle formation device 100 includes an arithmetic device to generate apparatus operation data to be transmitted to the soundness evaluation device, and a main storage device to temporarily store intermediate data in generative operation of the apparatus operation data, or each piece of information of apparatus operation data that has been generated. Furthermore, the vehicle formation device 100 includes a communication device to transmit the apparatus operation data that has been generated to the soundness evaluation device.

The vehicle appearance examination device 200 includes a sensor to measure a state of each unit from the appearance of the vehicle formation. Further, the vehicle appearance examination device 200 includes an arithmetic device to generate appearance examination data to be transmitted to the soundness evaluation device, and a main storage device to temporarily store intermediate data in generative operation of the appearance examination data, or appearance examination data that has been generated. Furthermore, the vehicle appearance examination device 200 includes a communication device to transmit the appearance examination data that has been generated to the soundness evaluation device.

The soundness evaluation device 300 includes an arithmetic device to perform various processes of soundness evaluation of the constituting apparatuses, soundness evaluation of the vehicle formation, visualized information generation of vehicle formation soundness, and the various types of information settings. Further, the soundness evaluation device 300 includes a main storage device to temporarily store the various types of intermediate data in the arithmetic device or the soundness evaluation information of the constituting apparatuses that has been generated, the soundness evaluation information of vehicle formation, and each piece of information of the visualized information. Furthermore, the soundness evaluation device 300 includes an external storage device to store the soundness evaluation information of the constituting apparatuses that has been generated, the soundness evaluation information of the vehicle formation, dependence relation information of apparatuses, and physical configuration information of the apparatuses. Further, the soundness evaluation device 300 includes a communication device to receive apparatus operation data, appearance examination data, and various types of setting information data related to the dependence relations of apparatuses or physical configuration of apparatuses, or to transmit the soundness evaluation information of the vehicle formation.

The plan generation device 400 includes an arithmetic device to generate a maintenance plan or an operation plan of the vehicle formation from the soundness evaluation information of the vehicle formation received, and a main storage device to temporarily store intermediate data in generative operation of the maintenance plan or the operation plan. Further, the plan generation device 400 includes an external storage device to store maintenance plan information data that has been generated or operation plan information data, and a communication device to receive the soundness evaluation information of the vehicle formation.

The soundness monitoring device 500 includes an arithmetic device to perform a visualized process of the soundness evaluation information of the vehicle formation for visualization received, and a generation process of various types of definition information such as dependence relations of constituting apparatuses or physical configuration of constituting apparatuses. Further, the soundness monitoring device 500 includes a main storage device to temporarily store intermediate data in each arithmetic operation. Furthermore, the soundness monitoring device 500 includes a communication device to receive visualized information data related to vehicle formation soundness evaluation, and to send various types of definition information such as dependence relations of the constituting apparatuses or physical configuration of the constituting apparatuses. Additionally, the soundness monitoring device 500 includes a display device to display visualized information of soundness evaluation of the vehicle formation, and an input device to input various types of definition information such as dependence relations of the constituting apparatuses or physical configuration of the constituting apparatuses.

Each device of the vehicle formation device 100, the vehicle appearance examination device 200, the soundness evaluation device 300, the plan generation device 400 and the soundness monitoring device 500 may be called each device of the soundness evaluation system 700.

Each device of the soundness evaluation system 700 is a computer.

Hereinafter, description will be made on an arithmetic device, a main storage device, an external storage device, a communication device, an input interface, an output interface and a communication device included in each device of the soundness evaluation system 700. The input interface is connected to the input device. The output interface is connected to the display device.

Each device of the soundness evaluation system 700 being a computer includes the arithmetic device (also referred to as a processor), and further includes other hardware components such as the main storage device (also referred to as a memory unit), the external storage device, the input interface, the output interface and the communication device. The arithmetic device is connected to the other hardware components via a signal line, and controls the other hardware components.

The vehicle formation device 100 includes, as functional elements, the operation data collection unit 101 and the operation data transmission unit 102.

The vehicle appearance examination device 200 includes, as functional elements, the appearance examination unit 201 and the examination data transmission unit 202.

The soundness evaluation device 300 includes, as functional elements, the vehicle data reception unit 301, the apparatus evaluation unit 302, the formation evaluation unit 303, the information setting unit 304, the evaluation information transmission unit 305 and the setting information reception unit 306.

The plan generation device 400 includes, as functional elements, the soundness evaluation information reception unit 401 and the planning unit 402.

The soundness monitoring unit 500 includes, as functional elements, the visualized information reception unit 501, the information visualizing unit 502, the information setting unit 503 and the setting information transmission unit 504.

Hereinafter, description will be made mainly on a hardware component by using the soundness evaluation device 300 as an example; however, it is also possible to apply the description below to another device.

For example, the functional elements of the computer are realized by software.

The arithmetic device is a device to execute a soundness evaluation program. For example, in the soundness evaluation device 300, a soundness evaluation program is a program to realize the functions of the vehicle data reception unit 301, the apparatus evaluation unit 302, the formation evaluation unit 303, the information setting unit 304, the evaluation information transmission unit 305 and the setting information reception unit 306.

The arithmetic device is an IC (integrated circuits) to perform arithmetic processing. Concrete examples of the arithmetic device are a CPU (central processing unit), a DSP (digital signal processor) and a GPU (graphics processing unit).

The main storage device is a storage device to temporarily store data. A concrete example of the main storage device is an SRAM (static random access memory) or a DRAM (dynamic random access memory).

The external storage device is a storage device to store data. A concrete example of the external storage device is an HDD. Further, the external storage device may be a portable storage medium such as an SD (registered trademark) memory card, a CF, a NAND flash, a flexible disc, an optical disk, a compact disk, a Blue-ray (registered trademark) disk, or a DVD. HDD is an abbreviation for "hard disk drive". SD (registered trademark) is an abbreviation for "secure digital". CF is an abbreviation for "CompactFlash (registered trademark)". DVD is an abbreviation for "digital versatile disk".

The input interface is a port which is connected to an input device such as a mouse, a keyboard or a touch panel. The input interface is, for example, a USB (universal serial bus) terminal. The input interface may be a port connected to a LAN (local area network).

The output interface is a port whereto a cable of a display device such as a display is connected. The output interface is, for example, a USB terminal or an HDMI (registered trademark) (high definition multimedia interface) terminal. The display is, for example, an LCD (liquid crystal display). The output interface is also referred to as a display device interface.

The communication device includes a receiver and a transmitter. The communication device is connected to a communication network such as a LAN, the internet, or a telephone line. The communication device is, for example, a communication chip or an NIC (network interface card).

The soundness evaluation program is executed in each device of the soundness evaluation system 700. The soundness evaluation program is read into an arithmetic device, and executed by the arithmetic device. The main storage device stores not only the soundness evaluation program, but also an OS (operating system). The arithmetic device executes the soundness evaluation program while executing the OS. The soundness evaluation program and the OS may be stored in an external storage device. The soundness evaluation program and the OS stored in the external storage device are loaded into the main storage device, and executed by the arithmetic device. A part of or the whole of the soundness evaluation program may be installed in the OS.

The soundness evaluation device 300 may include a plurality of processors to replace the arithmetic device. These plurality of processors share execution of the soundness evaluation program. Each processor is a device to execute the soundness evaluation program as with the arithmetic device.

The data, information signal values and variable values used, processed or output by the soundness evaluation program are stored in the main storage device, the external storage device, or a register or a cache memory in the arithmetic device.

For example, in the soundness evaluation device 300, "unit" of each unit of the vehicle data reception unit 301, the apparatus evaluation unit 302, the formation evaluation unit 303, the information setting unit 304, the evaluation information transmission unit 305 and the setting information reception unit 306 may be replaced with "circuit", "step", "procedure", "process", or "circuitry". The soundness evaluation program makes a computer perform a vehicle data reception process, an apparatus evaluation process, a formation evaluation process, an information setting process, an evaluation information transmission process and a setting information reception process. The "process" of the vehicle data reception process, the apparatus evaluation process, the formation evaluation process, the information setting process, the evaluation information transmission process and the setting information reception process may be replaced with "program", "program product", "computer-readable storage medium storing a program" or "computer-readable recording medium recording a program". Further, the soundness evaluation method is a method performed by executing the soundness evaluation program by each device of the soundness evaluation system 700.

The soundness evaluation program may be stored and provided in a computer-readable recording medium. Further, the soundness evaluation program may be provided as a program product.

\*\*\*Description of Operation\*\*\*

Next, description will be made on an operation of the soundness evaluation system 700 according to the present embodiment. The operation procedure of the soundness evaluation system 700 corresponds to a soundness evaluation method.

Further, a program to realize the operation of the soundness evaluation system 700 corresponds to the soundness evaluation program to make a computer perform the soundness evaluation process. The operation of the soundness evaluation system 700 is an operation of each device of the soundness evaluation system 700.

<Soundness Evaluation Process>

Figure 3:
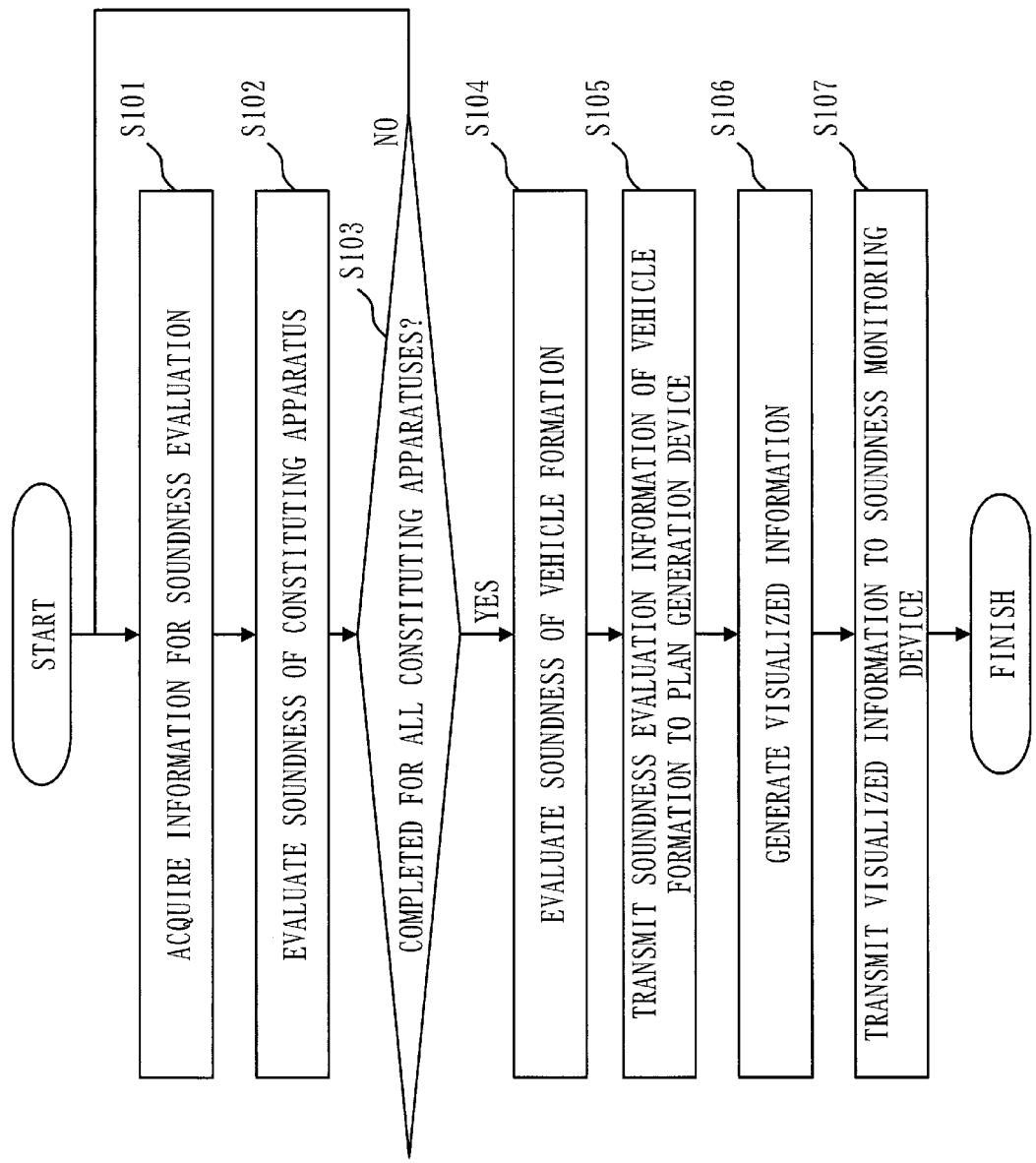
FIG. 3 is a diagram of an entire flow of a soundness evaluation process by a soundness evaluation device according to the first embodiment.

FIG. 3 is a diagram of an entire flow of the soundness evaluation process by the soundness evaluation device 300 according to the present embodiment.

The soundness evaluation process is performed by the soundness evaluation device 300. The soundness evaluation process may be performed at a regular timing such as daily or weekly, for example, or may be performed at an arbitrary timing.

In Step S101, the vehicle data reception unit 301 acquires apparatus operation data or appearance examination data corresponding to each constituting apparatus that constitutes the vehicle formation as information for apparatus soundness evaluation.

In Step S102, the apparatus evaluation unit 302 and the formation evaluation unit 303 evaluate soundness for individual constituting apparatuses.

The apparatus evaluation unit 302 calculates a soundness estimation value and an operation time limit for a terminal constituting apparatus that does not have a constituting apparatus whereon the own constituting apparatus depends among the plurality of constituting apparatuses. Further, the formation evaluation unit 303 calculates a soundness estimation value and an operation time limit for a constituting apparatus other than the terminal constituting apparatus.

In Step S103, the formation evaluation unit 303 checks whether evaluation for all the constituting apparatuses in the vehicle formation is completed. When the evaluation is not completed, the process returns to Step S101, and soundness evaluation for the remaining constituting apparatuses is repeated. When the evaluation is completed, the process proceeds to Step S104.

In Step S104, the formation evaluation unit 303 evaluates soundness for the vehicle formation, and generates soundness evaluation information including the soundness estimation value and the operation time limit with respect to the vehicle formation.

In Step S105, the formation evaluation unit 303 transmits the soundness evaluation information in the vehicle formation to the plan generation device 400 by the evaluation information transmission unit 305.

Further, in Step S106, the formation evaluation unit 303 generates visualized information to visualize soundness evaluation information in the vehicle formation.

Finally, in Step S107, the formation evaluation unit 303 transmits the visualized information to the soundness monitoring device 500.

Figure 4:
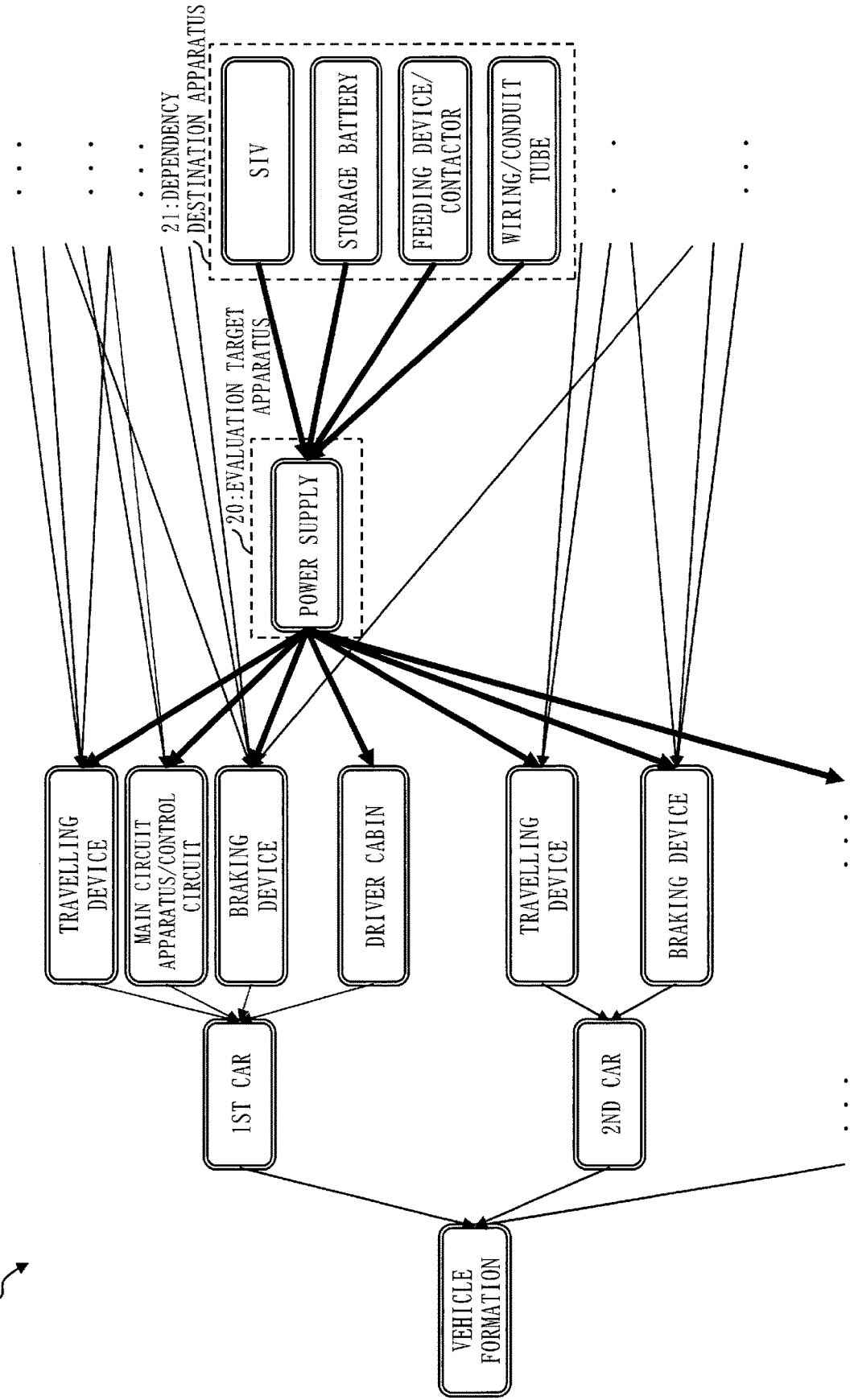
FIG. 4 is a diagram illustrating a construction example of dependence relation information stored in a dependence relation database according to the first embodiment.

FIG. 4 is a diagram illustrating a construction example of the dependence relation information 33 stored in the dependence relation database 332 according to the present embodiment.

The dependence relation database 332 stores the dependence relation information 33 wherein dependence relations between each constituting apparatuses of the plurality of constituting apparatuses 11, and importance degrees representing the intensity of the dependence relations are set, with the vehicle formation 10 being a vertex.

Figure 5:
FIG. 5 is a diagram illustrating an example of an importance degree between constituting apparatuses that are defined in a directed graph in dependence relation information according to the first embodiment.

In the dependence relation database 332, the dependence relations are defined in directed graphs, and the importance degrees of the dependence relations are associated with the directed graphs as illustrated in FIG. 5.

In the dependence relation information 33, functional relations in each of the vehicle formation, the vehicles, and the constituting apparatuses mounted on the vehicles are defined, by the directed graph network. Hereinafter, the vehicle formation 10 and the constituting apparatuses 11 linked to the vehicle formation may be called entire apparatuses in the vehicle formation. The entire apparatuses in the vehicle formation including the vehicle formation 10 itself include the vehicle formation 10, intermediate elements such as vehicles, and a terminal constituting apparatus such as an SIV or a storage battery. Further, each apparatus included in the dependence relation information 33 may be referred to by the element.

The terminal constituting apparatus is a constituting apparatus that does not have a constituting apparatus whereon the own constituting apparatus depends, that is, a constituting apparatus that does not have a directed graph bound for the own constituting apparatus.

In FIG. 4, the vehicle formation depends on the soundness state of each vehicle such as a first car, a second car, and so on. The vehicle depends on the soundness state of each constituting apparatus mounted on the vehicle. Further, a functional dependence relation between the constituting apparatuses is defined similarly.

For example, a power supply unit is an apparatus mounted on the first car as a physical configuration; however, the power supply unit has an influence on soundness of the functions of a plurality of constituting apparatuses across a plurality of vehicles. The power supply unit is denoted as a power supply in FIG. 4. Thus, in the following description, the power supply unit is described as the power supply.

The power supply has dependence relations with a plurality of constituting apparatuses across a plurality of vehicles. Therefore, when the dependence relations are represented in graphs, the power supply is connected to the plurality of constituting apparatuses by directed graphs. Further, the power supply is constituted by a plurality of terminal apparatuses such as an SIV and a storage battery. Therefore, the power supply is connected with the plurality of terminal apparatuses by the directed graphs.

Each directed graph representing the apparatus dependence relations between constituting apparatuses has information of weighting coefficients indicating the importance degrees between the constituting apparatuses.

FIG. 5 is a diagram illustrating an example of importance degrees between constituting apparatuses defined in the directed graphs in the dependence relation information 33 according to the present embodiment.

In FIG. 5, as a concrete example, directed graphs defining dependence relations of each constituting apparatus that constitutes the power supply, and the importance degrees between the power supply and each constituting apparatus are illustrated.

The importance degree is a weight in a dependence relation, which represents an intensity degree of dependence as a function.

In FIG. 5, the importance degree of the SIV in the power supply is represented as "importance degree"=40. The soundness of the power supply depends on the SIV most intensively. The importance degree is also called a weighting coefficient.

Hereinafter, the importance degrees are defined in the order of intensity, such as a storage battery (importance degree=30), a feeding device/contactor (importance degree=20), and a wiring/conduit tube (importance degree=10). In this manner, the importance degrees of dependence relations between each constituting apparatus in a vehicle formation are defined so that the total sum of the importance degrees of dependence relations with each constituting apparatus whereon one constituting apparatus depends becomes a fixed value. The fixed value is, for example, a value such as 100.

As another example, four directed graphs (arrows) between "power supply" and "SIV", "storage battery", "feeding device/contactor" and "wiring/conduit tube" may include importance degrees (weighting information) as follows.

Importance degree of "SIV" (weighting information the arrow between "power supply" and "SIV" has) is 0.5

Importance degree of "storage battery" (weighting information the arrow between "power supply" and "storage battery" has) is 0.2

Importance degree of "feeding device/contactor" (weighting information the arrow between "power supply" and "feeding device/contactor" has) is 0.2 Importance degree of "wiring/conduit tube" (weighting information the arrow between "power supply" and "wiring/conduit tube" has) is 0.1

Herein, the fixed value is 1.

<<Apparatus Soundness Evaluation Process>>

Figure 6:
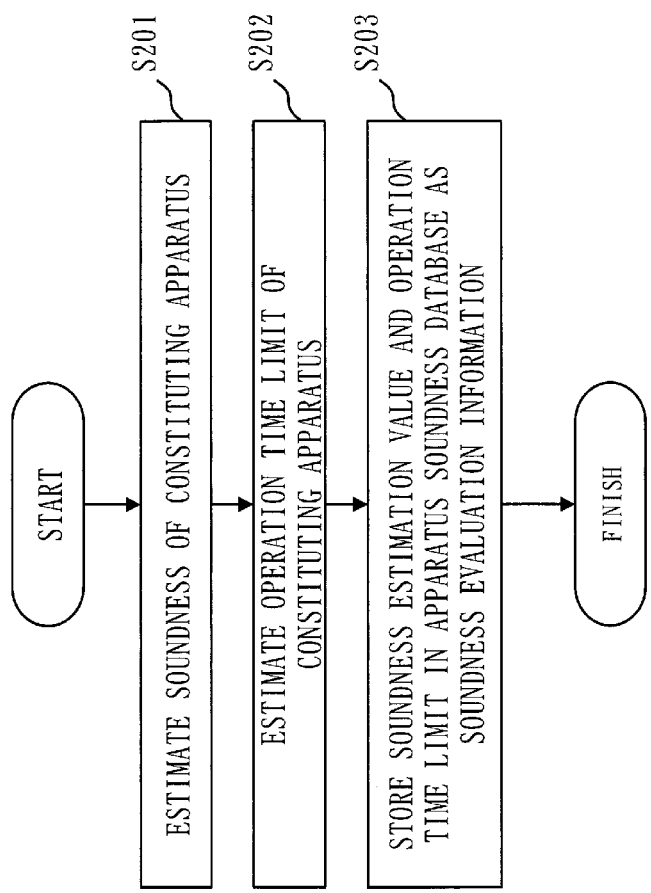
FIG. 6 is a flow diagram of an apparatus soundness evaluation process by an apparatus evaluation unit according to the first embodiment.

FIG. 6 is a flow diagram of the apparatus soundness evaluation process by the apparatus evaluation unit 302 according to the present embodiment.

The apparatus soundness evaluation process is performed by the apparatus evaluation unit 302 of the soundness evaluation device 300. Further, the apparatus soundness evaluation process corresponds to a detailed flow of a part of Step S102 in the diagram of the entire flow in FIG. 3.

The apparatus soundness evaluation process is a process to perform soundness evaluation for terminal constituting apparatuses in the vehicle formation being the evaluation target. In the example of FIG. 4, the terminal constituting apparatuses are the SIV, the storage battery, the feeding device/contactor, and the wiring/conduit tube.

In Step S201, the apparatus soundness estimation unit 321 estimates the soundness of the terminal constituting apparatuses as soundness estimation values based on apparatus operation data or appearance examination data corresponding to the terminal constituting apparatuses that constitute the vehicle formation.

Next, in Step S202, the apparatus operation time limit estimation unit 322 calculates the operation time limits of the terminal constituting apparatuses based on the soundness estimation values of the terminal constituting apparatuses.

In Step S203, each piece of information of the soundness estimation values and the operation time limits is stored in the apparatus soundness database.

The soundness estimation value representing soundness of a constituting apparatus is, for example, remaining life information indicating remaining days in which the constituting apparatus can operate without abnormality or a failure. Otherwise, the soundness estimation value is degradation degree information to quantize how much the condition is changed, i.e., degraded, from the present to the future, on the basis of a condition whereof soundness is ensured, such as in a brand-new condition or just after maintenance. The soundness estimation value is any index or both indexes of the remaining life information and the degradation degree information.

Further, any estimation method can be adopted as an estimation method of soundness in the apparatus soundness estimation unit 321 in Step S201, and an estimation method of operation time limits of the constituting apparatuses in the apparatus operation time limit estimation unit 322 in Step S202. For example, the method may be an estimation method by machine learning, an estimation method based on statistical analysis, or a method in prior art documents.

<<Formation Soundness Evaluation Process>>

Figure 7:
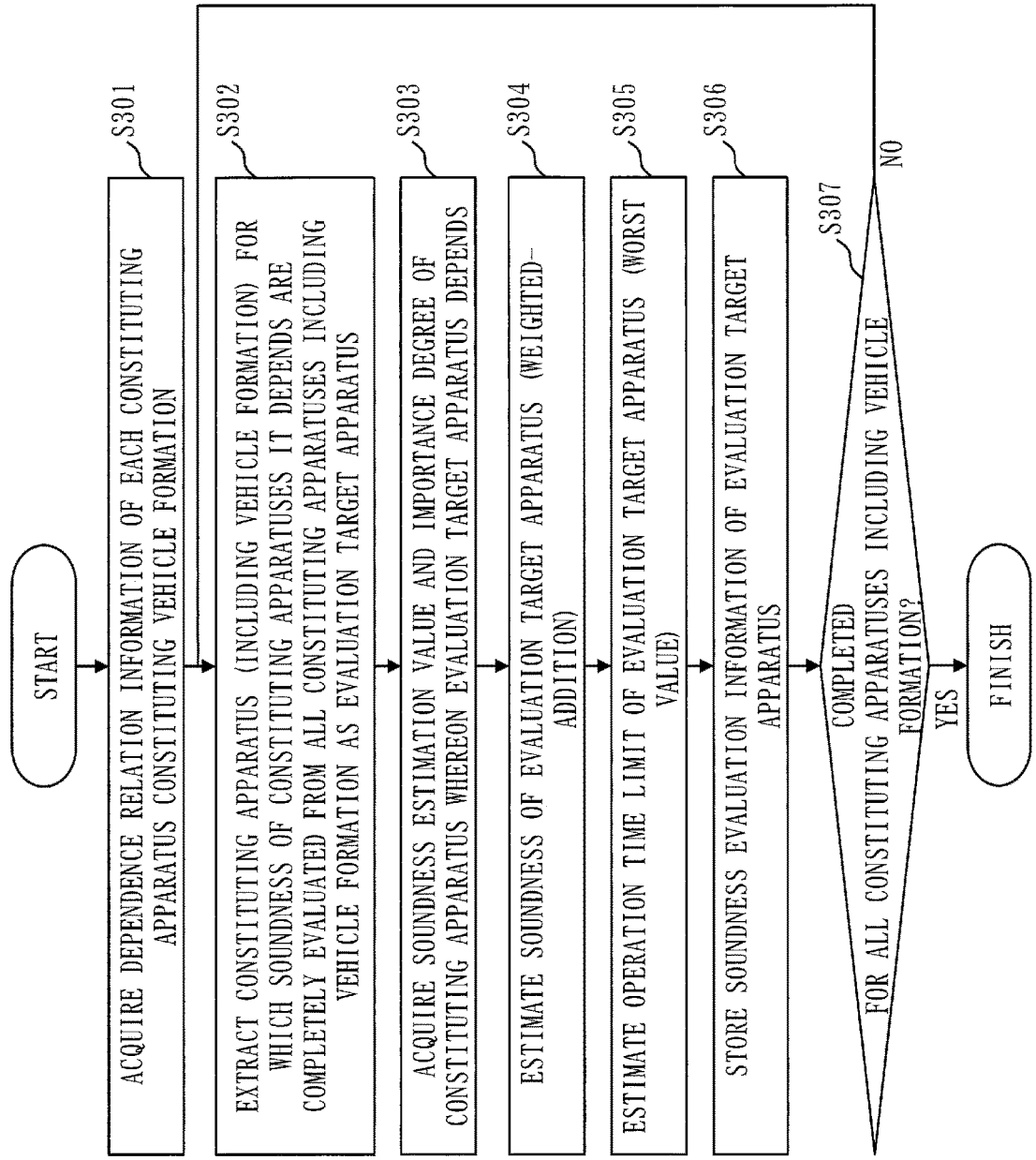
FIG. 7 is a flow diagram of a formation soundness evaluation process by a formation evaluation unit according to the first embodiment.

FIG. 7 is a flow diagram of a formation soundness evaluation process by the formation evaluation unit 303 according to the present embodiment.

The formation soundness evaluation process is a process of evaluating soundness for the vehicle formation performed by the formation evaluation unit 303. Further, the formation soundness evaluation process corresponds to a detailed flow of a part of Step S102 and Step S104 in the entire flow of FIG. 3.

In the example of FIG. 4, apparatus soundness evaluation of terminal constituting apparatuses as the SIV, the storage battery, the feeding device/contactor and the wiring/conduit tube is completed. Meanwhile, soundness evaluation of constituting apparatuses of intermediate elements such as a power supply or a braking device has not been completed. The formation soundness evaluation process is a process to perform soundness evaluation of these intermediate elements and soundness evaluation of the vehicle formation.

The formation evaluation unit 303 acquires the dependence relation information 33, and performs soundness evaluation with respect to evaluation target apparatuses using the soundness estimation value of each constituting apparatus among the plurality of constituting apparatuses, and the importance degrees of dependence relations. The evaluation target apparatus is a constituting apparatus being an evaluation target among the plurality of constituting apparatuses that constitute the vehicle formation. The evaluation target apparatus has a constituting apparatus whereon the own evaluation target apparatus depends. That is, a directed graph bound for the own evaluation target apparatus exists for the evaluation target apparatus.

The constituting apparatus whereon the evaluation target apparatus depends may be called a dependency destination apparatus.

The formation evaluation unit 303 calculates, by using a soundness estimation value of a dependency destination apparatus whereon the evaluation target apparatus depends, and importance degrees of dependence relations between the evaluation target apparatus and each dependency destination apparatus, a soundness estimation value in consideration of the importance degree of the dependence relation in the evaluation target apparatus.

The soundness estimation values of each constituting apparatus among the plurality of constituting apparatuses include the soundness estimation values of the terminal constituting apparatuses.

In Step S301, the formation soundness estimation unit 331 acquires the dependence relation information 33 of the constituting apparatuses 11 that constitute the vehicle formation 10 being the evaluation target, which is stored in the dependence relation database 332.

In Step S302, the formation soundness estimation unit 331 extracts a constituting apparatus for which soundness evaluation of constituting apparatuses whereon the constituting apparatus itself depends has been entirely completed from among the entire apparatuses in the vehicle formation including the vehicle formation itself, and regards the constituting apparatus as an evaluation target apparatus 20 being a target to evaluate soundness.

By taking a constituting apparatus for which a constituting apparatus whereon the own constituting apparatus depends exists among the plurality of constituting apparatuses as an evaluation target apparatus 20, the formation evaluation unit 303 calculates a soundness estimation value of the evaluation target apparatus 20. Then, when calculation of soundness estimation values for all the constituting apparatuses 11 whereon the vehicle formation 10 depends is completed in the end, the formation evaluation unit 303 calculates a soundness estimation value of the vehicle formation 10.

Specifically, the formation evaluation unit 303 repeats the process from Step S302 to Step S307.

In the concrete example of FIG. 4, the power supply shall be the evaluation target apparatus 20. Further, the constituting apparatuses whereon the power supply depends are an SIV, a storage battery, a feeding device/contactor and a wiring/conduit tube. The SIV, the storage battery, the feeding device/contactor and the wiring/conduit tube are dependency destination apparatuses 21 whereon the power supply depends. The soundness evaluation of the power supply becomes possible when soundness evaluation has been completed for all the SIV, the storage battery, the feeding device/contactor and the wiring/conduit tube.

In the process of Step S302, when the soundness evaluation for the apparatuses being terminal elements (in FIG. 4, the SIV, the storage battery, the feeding device/contactor and the wiring/conduit tube), for example, is completed, an apparatus being an intermediate element (in FIG. 4, the power supply) which only depends on soundness of the apparatuses being the terminal elements is extracted. Further, a travelling device of the first car in FIG. 4, for example, is extracted as a next evaluation target apparatus when soundness evaluation of each constituting apparatus being the terminal elements and the power supply has been completed. When this is repeated, the vehicle formation shall be extracted as a next evaluation object apparatus at the end of repetition.

Next, in Step S303, the formation soundness estimation unit 331 acquires a soundness estimation value and an operation time limit of the dependency destination apparatus 21 whereon the evaluation target apparatus 20 depends. Further, the formation soundness estimation unit 331 acquires an importance degree of a dependence relation between the evaluation target apparatus 20 and the dependency destination apparatus 21.

The formation soundness estimation unit 331 acquires the soundness evaluation information including the soundness estimation value and the operation time limit of the dependency destination apparatus 21 from the apparatus soundness database 323 or the formation soundness database 334.

When the dependency destination apparatus 21 is a terminal constituting apparatus, soundness evaluation information is acquired from the apparatus soundness database 323. When the dependency destination apparatus 21 is a constituting apparatus being the intermediate element such as a vehicle or a power supply, the soundness evaluation information is acquired from the formation soundness database 334.

The formation soundness database 334 stores the soundness evaluation information including the soundness estimation value and the operation time limit with respect to the constituting apparatus being the intermediate element that has been already calculated in the process from Step S302 to Step S307.

The formation soundness estimation unit 331 acquires the importance degree of the dependence relation between the evaluation target apparatus 20 and the dependency destination apparatus 21, that is, a weight in the dependence relation, from the dependence relation information 33.

In the concrete example of FIG. 4, the soundness estimation values, the operation time limits and the importance degrees of the dependence relations are acquired for the SIV, the storage battery, the feeding device/contactor and the wiring/conduit tube being the dependency destination apparatuses whereon the power supply depends.

In Step S304, the formation soundness estimation unit 331 calculates a soundness estimation value of the evaluation target apparatus 20 based on the soundness estimation values and the importance degrees of dependence relations of all the constituting apparatuses whereon the evaluation target apparatus 20 depends. The formation soundness estimation unit 331 calculates the soundness estimation value of the evaluation target apparatus 20 by weighted-addition of each soundness estimation value of all the constituting apparatuses whereon the evaluation target apparatus 20 depends while taking each importance degree into consideration.

Specifically, the formation soundness estimation unit 331 multiplies the soundness estimation value of the dependency destination apparatus by the importance degree of the dependence relation between the evaluation target apparatus 20 and the dependency destination apparatus. The formation soundness estimation unit 331 adds the value obtained by multiplication, and regards the value obtained by addition as the soundness estimation value of the evaluation target apparatus 20.

Description will be made on a case wherein a soundness estimation value H of an evaluation target apparatus is calculated using weighted-addition while taking the importance degree of the soundness estimation value into consideration, in the process of Step S304. It is assumed that the evaluation target apparatus depends on the soundness of n-pieces of constituting apparatuses.

The soundness estimation value of each constituting apparatus whereon the evaluation target apparatus depends, extracted in Step S303, shall be Hi (i=1, 2, . . . , n), and the importance degree of each constituting apparatus to depend on, extracted in Step S303, shall be wi (i=1, 2, . . . , n), and the sum of the importance degrees of dependence relations of all the constituting apparatuses shall be W. The evaluation target apparatus shall depend on the soundness of n-pieces of constituting apparatuses. In this case, it is possible to perform weighted-addition as in Formula 1 as follows.

$$H = \frac{1}{W}\sum_{i=1}^{n}(w_i \cdot H_i) \qquad \text{[Formula 1]}$$

Formula 1 enables soundness evaluation of the evaluation target apparatus in consideration of importance degrees of each apparatus having dependence relations.

In Step S305, the time limit estimation unit 333 calculates the operation time limit 32 of the evaluation target apparatus 20 based on the dependence relation information 33 and the operation time limit of the dependency destination apparatus. The formation evaluation unit 303 stores the soundness estimation value 31 and the operation time limit 32 of the evaluation target apparatus 20 in the formation soundness database 334.

The operation time limit of the dependency destination apparatus includes operation time limits of terminal constituting apparatuses.

Specifically, the time limit estimation unit 333 extracts a worst value from the operation time limits of all the constituting apparatuses whereon the evaluation target apparatus 20 depends, and calculates the operation time limit 32 of the evaluation target apparatus 20 based on the worst value. The time limit estimation unit 333 extracts an operation time limit with a date closest to the evaluation point of time as the worst value.

That is, the time limit estimation unit 333 regards an operation time limit that arrives the earliest among the operation time limits of the dependency destination apparatuses of the evaluation target apparatus 20 as the operation time limit 32 of the evaluation target apparatus 20.

In Step S306, the formation soundness estimation unit 331 stores the soundness estimation value 31 and the operation time limit 32 of the evaluation target apparatus 20 as the soundness evaluation information 34 of the evaluation target apparatus 20 in the formation soundness database 334.

In Step S307, the formation soundness estimation unit 331 checks whether soundness evaluation of all the apparatuses (intermediate elements such as a vehicle formation and a vehicle, etc., and each constituting apparatus) in the vehicle formation including the vehicle formation itself has been completed. When it has not been completed, the process is returned to Step S302 and the process is repeated, whereas when it has been completed, the process is finished.

In a concrete example of FIG. 4, "power supply" corresponds to a first evaluation target apparatus. Further, an evaluation target apparatus of the second loop of "formation soundness evaluation process" corresponds to a constituting apparatus that depends only on either a terminal constituting apparatus or the first evaluation target apparatus. In the example of FIG. 4, it corresponds to a constituting apparatus such as "travelling device" or "braking device".

As described, in Step S302, the constituting apparatuses for which soundness evaluation has been completed until that point of time are referred to each time, the constituting apparatus which depends only on any of those is regarded as the next evaluation target apparatus, and when soundness evaluation is finished until "vehicle formation", the process is completed in the end.

<Variations of Soundness Evaluation of Vehicle Formation>

Description will be made on variations of soundness evaluation of a vehicle formation.

In estimation of soundness of the vehicle formation, the soundness evaluation device 300 may construct the dependence relation information 33 for every point of view desired to be considered in evaluation of soundness, and evaluate soundness of the vehicle formation separately for each piece of dependence relation information 33.

Specifically, in estimation of vehicle formation soundness, the dependence relation information 33 is constructed for every point of view desired to be considered in soundness evaluation such as safety or comfortability, and the soundness of the vehicle formation is evaluated separately.

Further, the soundness evaluation device 300 may evaluate soundness of the vehicle formation by setting a virtual intermediate evaluation point in dependence relation information for a constituting apparatus with redundant configuration or in a multiplex system, in estimation of soundness of the vehicle formation.

For example, for a constituting apparatus which is made redundant from the point of view of safety, it is possible to virtually set an intermediate evaluation point unifying master system/slave system soundness evaluation information. For example, when braking devices have redundant configuration in each vehicle, it is possible to set a virtual intermediate evaluation point unifying pieces of soundness information of all the braking devices inside a same vehicle between each braking device and the vehicle, in the dependence relation information. In this manner, it is possible to suitably evaluate soundness of an apparatus having redundant configuration as well.

Further, in estimation of soundness of the vehicle formation, the soundness evaluation device 300 may evaluate the soundness of the vehicle configuration by setting an intermediate evaluation point based on the maintenance unit in dependence relation information from a point of view of the maintenance plan and execution.

For example, it is possible to virtually set an intermediate evaluation point unifying pieces of soundness evaluation information of each constituting apparatus per unit of a section to be performed maintenance in the maintenance plan from a point of view of maintenance efficiency. For example, there is a case wherein underfloor apparatuses such as a brake, a motor or a control apparatus are performed maintenance together, as a unit of maintenance section. In this case, in the dependence relation information, it is possible to virtually set an intermediate evaluation point unifying the soundness evaluation information of the underfloor apparatuses inside the same vehicle between each constituting apparatus and the vehicle. In this manner, it is possible to evaluate soundness in unit of a section to be performed maintenance, and to reflect the soundness in the maintenance plan effectively.

Further, with respect to the dependence relation between constituting apparatuses, a smallest unit of maintenance is set to all the elements corresponding to the terminal of the dependence relation. In this case, a maintenance target apparatus of a smallest unit such as an SIV may be set to a terminal element, or an examination item for a maintenance target apparatus of a smallest unit may be set to a terminal element.

Furthermore, with respect to the dependence relations between constituting apparatuses, relations may be defined for each point of view of soundness evaluation such as safety or comfortability. By defining the dependence relations for each point of view, in a case wherein a plurality of formations (a plurality of apparatuses) reach the operation time limits on a certain day, for example, it is possible to utilize the dependence relations for prioritization of the maintenance plan such that which formation (apparatus) should be maintained first in making the maintenance plan.

<<Visualized Information Generation Process>>

Figure 8:
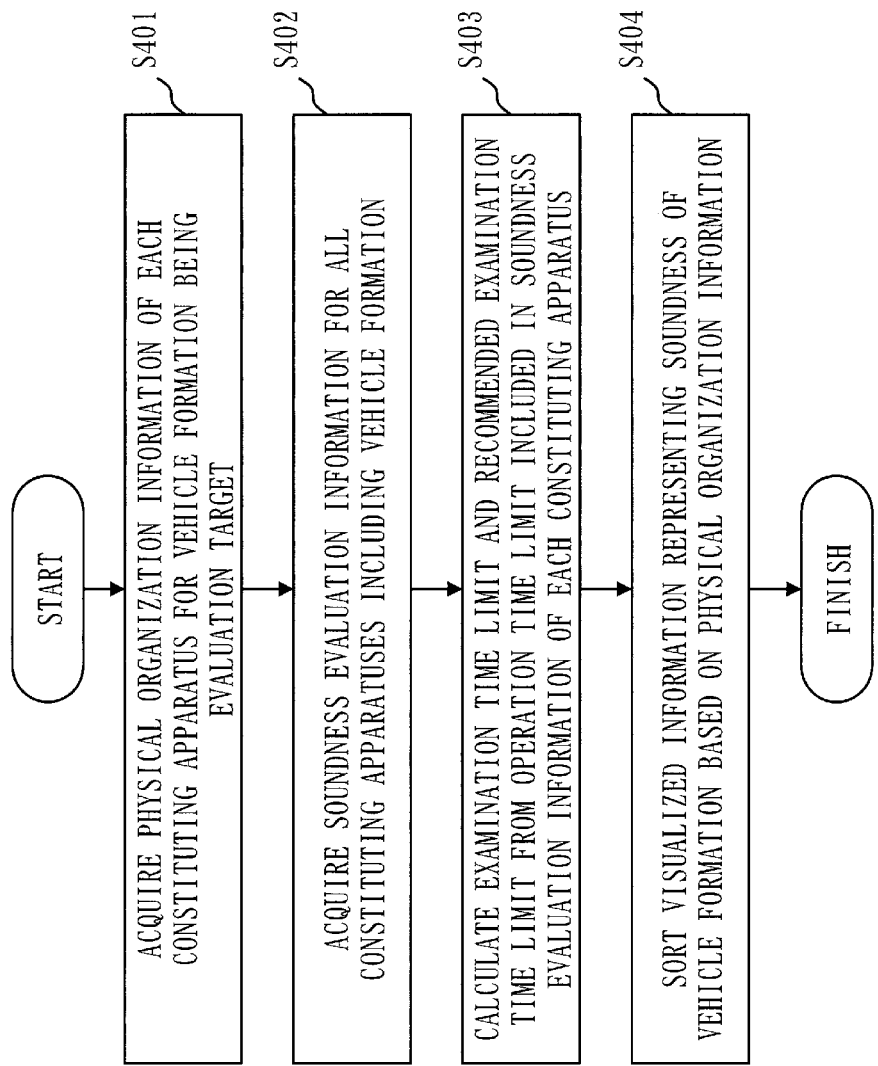
FIG. 8 is a flow diagram of a visualized information generation process by a visualized information generation unit according to the first embodiment.

FIG. 8 is a flow diagram of a visualized information generation process by the visualized information generation unit 335 according to the present embodiment.

The visualized information generation process is performed by the visualized information generation unit 335. Further, the present process corresponds to a detailed flow of Step S106 in the entire flow of FIG. 3.

When calculation of a soundness estimation value and an operation time limit with respect to the vehicle formation is completed, the visualized information generation unit 335 calculates an examination time limit representing each examination time limit of the vehicle formation and each constituting apparatus. Then, the visualized information generation unit 335 generates visualized information 35 to visualize each soundness and examination time limit of the vehicle formation and each constituting apparatus.

Further, the visualized information generation unit 335 calculates a recommended examination time limit that recommends start of examination of each of the vehicle formation and each constituting apparatus based on each examination time limit of the vehicle formation and each constituting apparatus. Then, the visualized information generation unit 335 also includes information to visualize each recommended examination time limit of the vehicle formation and each constituting apparatus in the visualized information 35.

The visualized information generation unit 335 generates visualized information to visualize soundness, examination time limits and recommended examination time limits of each of the vehicle formation and each constituting apparatus as a time-series transition from the past to the present, and further to the future.

In Step S401, the visualized information generation unit 335 acquires physical configuration information of the vehicle formation stored in the physical configuration database 336.

In Step S402, the visualized information generation unit 335 acquires soundness evaluation information of the vehicle formation and the entire constituting apparatuses that constitute the vehicle formation stored in the formation soundness database 334.

In Step S403, the visualized information generation unit 335 calculates each piece of information of the examination time limit and the recommended examination time limit of each constituting apparatus based on the operation time limit of the soundness evaluation information.

Finally, in Step S403, the visualized information generation unit 335 sorts soundness evaluation information of the entire constituting apparatuses acquired in accordance with the physical configuration information acquired.

With respect to the process of Step S403, the examination time limit shall be a date obtained by considering a required number of days for examination of the constituting apparatus, and subtracting the required number of days for examination from the operation time limit. Further, the recommended examination time limit shall be a date obtained by considering the number of days necessary for getting conversion parts related to maintenance of the relevant constituting apparatus, and a smallest number of days (lead time) necessary for securing maintenance workers, and subtracting the number of days necessary for getting conversion parts and the smallest number of days from the examination time limit. In this case, the required number of days for examination and the lead time can be set separately for each vehicle formation and each apparatus constituting the vehicle formation, and can be set and changed by a maintenance worker with the soundness monitoring device 500.

Further, when the flow of the visualized information generation process in FIG. 8 is completed, in the process of Step S107, the visualized information generation unit 335 transmits the visualized information 35 of the vehicle formation soundness to the soundness monitoring device 500.

Figure 9:
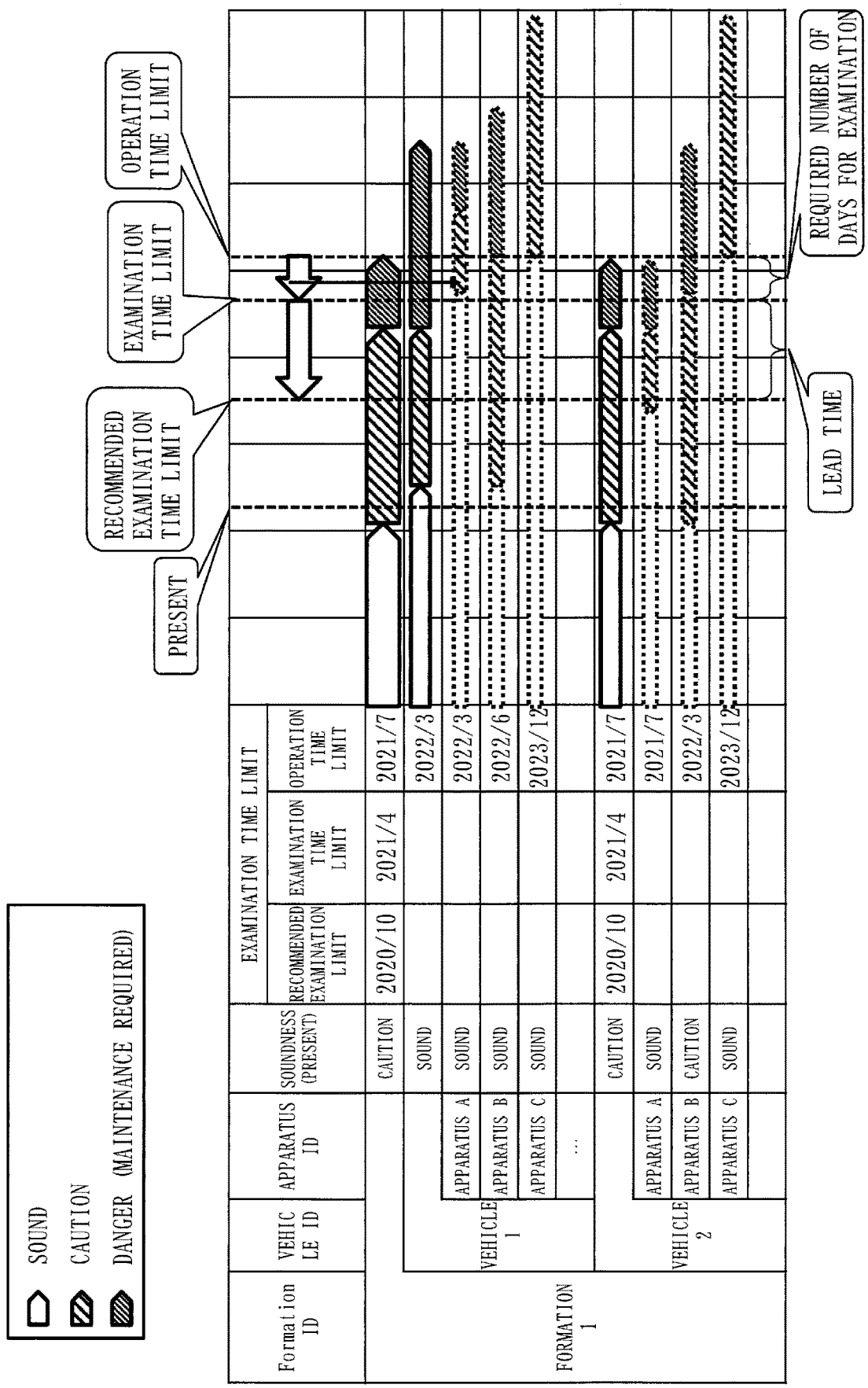
FIG. 9 is a diagram illustrating an example of visualized information to visualize soundness evaluation information according to the first embodiment.

FIG. 9 is an example of the visualized information 35 to visualize the soundness evaluation information according to the present embodiment.

FIG. 9 illustrates a display example to visualize soundness evaluation information of each of the vehicle formation of the evaluation target, and a plurality of constituting apparatuses that constitute the vehicle formation, in the soundness monitoring device 500.

In FIG. 9, by the process of Step S404, the vehicle formation and each constituting apparatus are arranged in the order sorted based on the physical configuration of the constituting apparatuses in the vehicle formation. Further, in the column on the immediate right, soundness estimation values at an evaluation point of time (present) are set. On the further right side, information (recommended examination time limit/examination time limit/operation time limit) related to examination time limits of the apparatuses are set. Then, to the side, on the rightmost side in the diagram, states of the time-series change in the soundness estimation values from the past to the present, further to the future are displayed.

The soundness estimation values may be displayed in numeric values, or may be converted into and displayed in several kinds of label information such as "sound", "caution" and "danger" as in FIG. 9. Further, lines showing the present and each date of a recommended examination time limit/examination time limit/operation time limit of the relevant vehicle formation may be displayed in a superimposed state on the portions of time-series change in the soundness estimation values.

Figure 10:
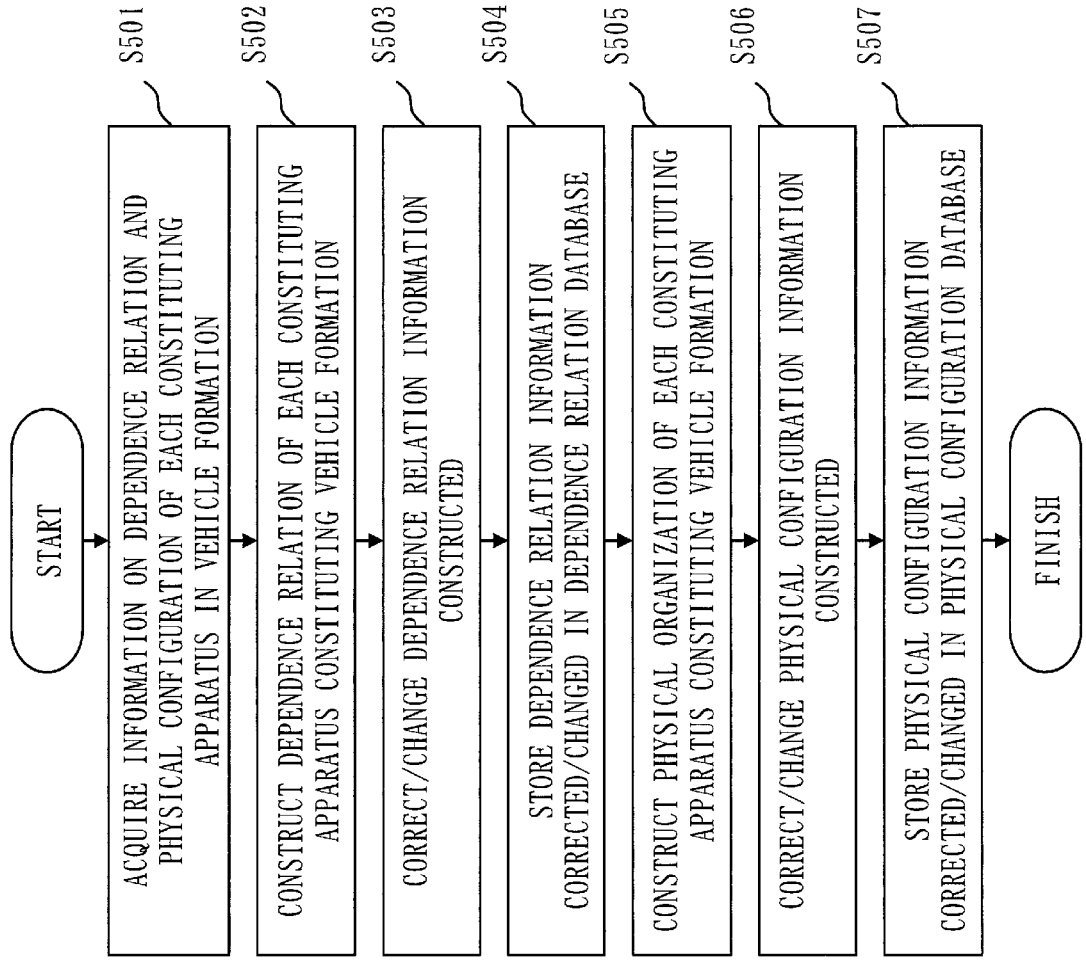
FIG. 10 is a flow diagram of a process to define a dependence relation database and a physical configuration database according to the first embodiment.

FIG. 10 is a flow diagram of a process to define the dependence relation database 332 and the physical configuration database 336 according to the present embodiment.

FIG. 10 illustrates a processing flow related to definitions of apparatus dependence relation information and apparatus physical configuration information necessary for soundness evaluation of the vehicle formation.

The information setting unit 304 of the soundness evaluation device 300 acquires information on the dependence relations and the physical configuration of a plurality of constituting apparatuses from a control device of the vehicle formation being the evaluation target, and stores the information in a database.

The information setting unit 304 acquires information to correct or change the information on the dependence relations and the physical configuration of the plurality of constituting apparatuses, and corrects or changes the database. The information to correct or change the information on the dependence relations and the physical configuration of the plurality of constituting apparatuses may be acquired from, for example, a maintenance worker via an input device of the soundness monitoring device 500.

In Step S501, the vehicle data reception unit 301 acquires information on the dependence relations and the physical configuration of each constituting apparatus that constitutes the vehicle formation, from a control device included in the vehicle formation.

In Step S502, the information setting unit 304 constructs the dependence relations of each constituting apparatus that constitutes the vehicle formation as the dependence relation information 33.

In Step S503, the information setting unit 304 corrects or changes the dependence relation information 33 that has been constructed based on the information acquired by the setting information reception unit 306.

In Step S504, the information setting unit 304 stores the dependence relation information 33 corrected or changed in the dependence relation database 332.

In Step S505, the information setting unit 304 constructs the physical configuration of each constituting apparatus that constitutes the vehicle formation as the physical configuration information 36.

In Step S506, the information setting unit 304 corrects or changes the physical configuration information 36 that has been constructed based on the information acquired by the setting information reception unit 306.

In Step S507, the information setting unit 304 stores the physical configuration information 36 corrected or changed in the physical configuration database 336.

As for the process of Step S501, the information on the dependence relations and the physical configuration of each constituting apparatus in the vehicle formation may be acquired from a control device such as a train control and management system (TCMS) to control the entire vehicle formation, for example.

Next, as for the processes of Step S503 and Step S505, the dependence relation information 33 or the physical configuration information 36 can be corrected or changed at the information setting unit 503 of the soundness monitoring device 500. Herein, information that can be corrected or changed is connections (directed graphs) of the dependence relations or the physical configuration, and importance degrees (weighting coefficients) of the dependence relations between each constituting apparatus. It is possible to not only perform correction or change of information once at the beginning as preparation for performing soundness evaluation, but also review correction or change of information appropriately while monitoring the time-series change in soundness evaluation.

\*\*\*Other Configurations\*\*\*

In the present embodiment, functions of each device of the soundness evaluation system 700 are realized by software. As a variation, the functions of each device of the soundness evaluation system 700 may be realized by hardware.

Specifically, each device of the soundness evaluation system 700 includes an electronic circuit instead of the arithmetic device.

The electronic circuit is a dedicated electronic circuit to realize the functions of each device of the soundness evaluation system 700. The electronic circuit is, for example, a single circuit, a composite circuit, a processor that is made into a program, a processor that is made into a parallel program, a logic IC, a GA, an ASIC, or an FPGA. GA is an abbreviation for gate array. ASIC is an abbreviation for application specific integrated circuit. FPGA is an abbreviation for field-programmable gate array.

The functions of each device of the soundness evaluation system 700 may be realized by one electronic circuit, or may be realized dispersively by a plurality of electronic circuits.

As an example of another variation, a part of the functions of each device of the soundness evaluation system 700 may be realized by an electronic circuit, and the rest of the functions may be realized by software. Further, a part of or all the functions of each device of the soundness evaluation system 700 may be realized by firmware.

Each of the processors and the electronic circuits may be also called processing circuitry. That is, the functions of each device of the soundness evaluation system 700 are realized by processing circuitry.

Description of Effect of Present Embodiment

As described above, according to the present embodiment, in order to make and optimize a maintenance plan in railroad maintenance, it is possible to acquire soundness evaluation information for constituting apparatuses that constitute a vehicle formation, and to evaluate soundness by units of vehicle formation in consideration of the importance of each constituting apparatus in the vehicle formation.

The soundness evaluation system according to the present embodiment makes it possible to evaluate soundness of a vehicle formation by integrating information of soundness estimation values estimated for each constituting apparatus that constitutes the vehicle formation in consideration of the dependence relations between constituting apparatuses and the importance degrees. In this case, the information on the dependence relations between the constituting apparatuses and the importance degrees are held as, for example, a directed graph network. In this manner, it is possible not only to easily define the dependence relations between the constituting apparatuses, but also to perform utilization such as to analyze the extent of influence when a certain constituting apparatus fails. In this manner, it becomes possible to perform utilization more than just information usage for status monitoring of soundness and for making a maintenance plan, to increase the usability and reliability of soundness evaluation, and realize sophistication and optimization of the maintenance plan.

Second Embodiment

In the present embodiment, description will be made mainly on points different from those in the first embodiment and points added to the first embodiment.

In the present embodiment, components having functions similar to those in the first embodiment are denoted by same reference numerals, for which description is omitted.

In the first embodiment, the apparatus soundness evaluation process and the formation soundness evaluation process are configured to be performed on the same server; however, it is possible to have them configured on different servers.

Figure 11:
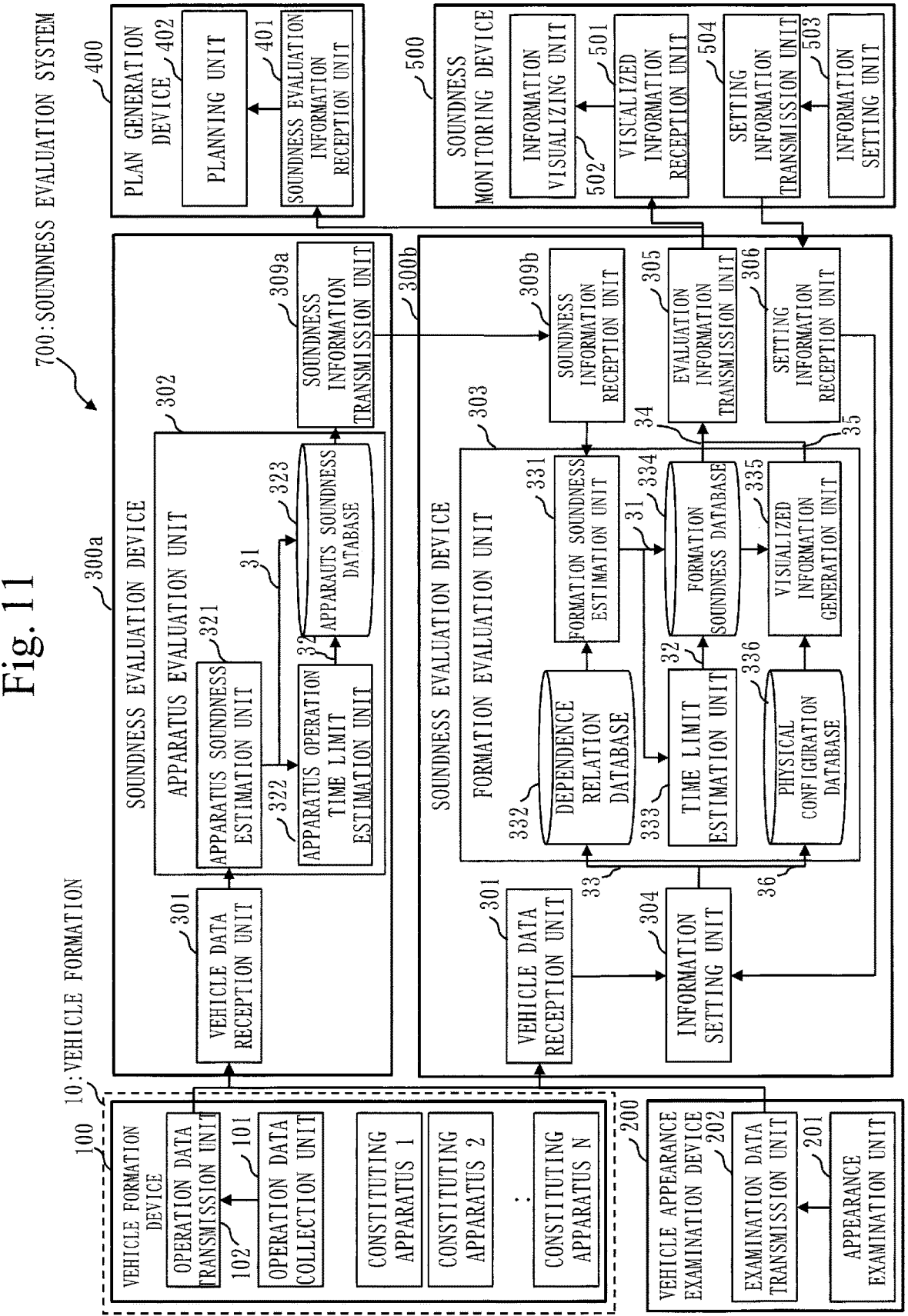
FIG. 11 is a diagram illustrating a configuration example of a soundness evaluation system according to a second embodiment.

FIG. 11 is a diagram illustrating a configuration example of the soundness evaluation system 700 according to the present embodiment.

The soundness evaluation system 700 according to the present embodiment is constituted by the vehicle formation device 100, the vehicle appearance examination device 200, a soundness evaluation device 300*a*, a soundness evaluation device 300*b*, the plan generation device 400 and the soundness monitoring device 500.

The soundness evaluation device 300*a* evaluates soundness of a terminal constituting apparatus, and generates soundness evaluation information for the terminal constituting apparatus. The soundness evaluation device 300*a* is also called an apparatus soundness evaluation server.

The soundness evaluation device 300*b* evaluates soundness of each of constituting apparatuses other than the terminal constituting apparatus, and the vehicle formation, and generates soundness evaluation information with respect to each of the constituting apparatuses other than the terminal constituting apparatus, and the vehicle formation. The soundness evaluation device 300*b* is also called a vehicle formation soundness evaluation server.

The soundness evaluation device 300*a* includes the vehicle data reception unit 301, the apparatus evaluation unit 302 and a soundness information transmission unit 309*a*.

The soundness information transmission 309*a* transmits soundness evaluation information of the constituting apparatuses generated by the apparatus evaluation unit 302 to the soundness evaluation device 300*b*.

The functions and the operations of the vehicle data reception unit 301 and the apparatus evaluation unit 302 are similar to those in the first embodiment.

The soundness evaluation device 300*b* includes the vehicle data reception unit 301, the formation evaluation unit 303, the information setting unit 304, a soundness information reception unit 309*b*, the evaluation information transmission unit 305 and the setting information reception unit 306.

The soundness information reception unit 309*b* receives the soundness evaluation information transmitted from the soundness information transmission unit 309*a* of the soundness evaluation device 300*a*. The soundness information reception unit 309*b* outputs the soundness evaluation information received to the formation soundness estimation unit 331.

The functions and the operations of the vehicle data reception unit 301, the formation evaluation unit 303, the information setting unit 304, the evaluation information transmission unit 305 and the setting information reception unit 306 are similar to those in the first embodiment.

Figure 12:
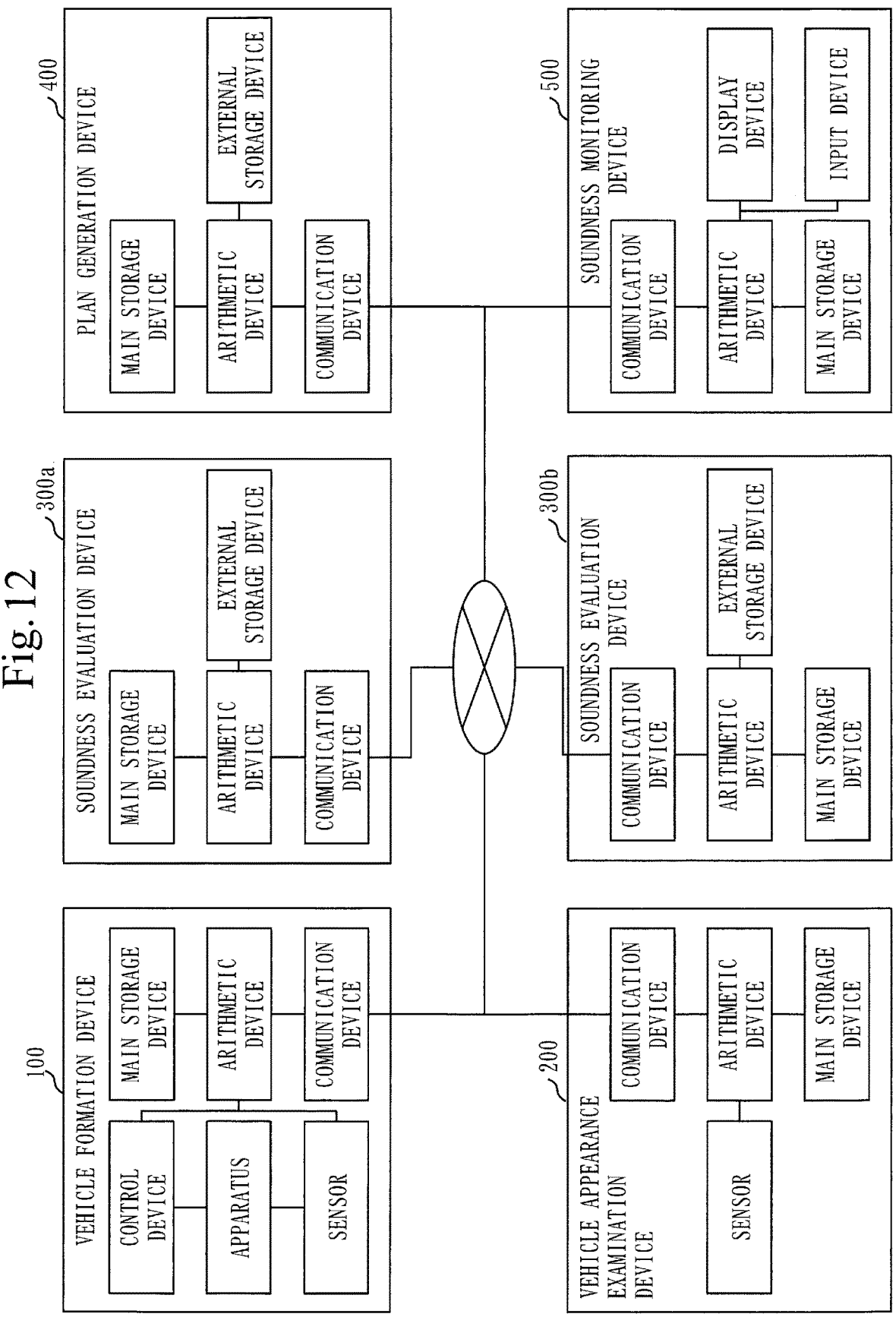
FIG. 12 is a diagram illustrating an example of a hardware configuration of the soundness evaluation system according to the second embodiment.

FIG. 12 is a diagram illustrating an example of a hardware configuration of the soundness evaluation system 700 according to the present embodiment.

The hardware configuration of the soundness evaluation system 700 is constituted by the vehicle formation device 100, the vehicle appearance examination device 200, the soundness evaluation device 300*a*, the soundness evaluation device 300*b*, the plan generation device 400 and the soundness monitoring device 500.

The soundness evaluation device 300*a*, the soundness evaluation device 300*b* and the plan generation device 400 may be configured on an on-premise server or a cloud.

The vehicle formation device 100, the vehicle appearance examination device, the plan generation device 400 and the soundness monitoring device 500 are similar to those in the first embodiment.

The soundness evaluation device 300*a* includes an arithmetic device to perform apparatus soundness evaluation, and a main storage device to temporarily store various pieces of intermediate data or soundness evaluation information of constituting apparatuses that has been generated, in the arithmetic device. Further, the soundness evaluation device 300*a* includes an external storage device to store the soundness evaluation information of the constituting apparatuses that has been generated, and a communication device to receive apparatus operation data or appearance examination data, or to transmit soundness evaluation information of the constituting apparatuses.

The soundness evaluation device 300b includes an arithmetic device to perform various processes of soundness evaluation of the vehicle formation, visualized information generation of soundness of the vehicle formation, and setting of various types of information. Further, the soundness evaluation device 300b includes a main storage device to temporarily store each piece of data of various pieces of intermediate data in the arithmetic device or soundness evaluation information of the vehicle formation that has been generated, and visualized information. Further, the soundness evaluation device 300b includes an external storage device to store the soundness evaluation information of the vehicle formation that has been generated, dependence relation information of the constituting apparatuses, and physical configuration information of the constituting apparatuses. Furthermore, the soundness evaluation device 300b receives the soundness evaluation information of the constituting apparatuses or various types of setting information data related to the dependence relations and the physical configuration of the constituting apparatuses, and transmits the soundness evaluation information of the vehicle formation.

Each operation in the present embodiment is similar to that in the first embodiment.

As described above, by making the configuration as in the present embodiment, it is possible to distribute loads of each process related to soundness evaluation that has been concentrated in the soundness evaluation server in the first embodiment, and to make each process be operated independently.

Third Embodiment

In the present embodiment, description will be made mainly on points different from the first and second embodiments, and points added to the first and second embodiments.

In the present embodiment, components having functions similar to those in the first and second embodiments are denoted by same reference numerals, for which description is omitted.

In the first and second embodiments, the apparatus soundness evaluation process is configured to be performed on a server. In the present embodiment, it is possible to configure the apparatus soundness evaluation process to be performed in the vehicle formation device 100.

Figure 13:
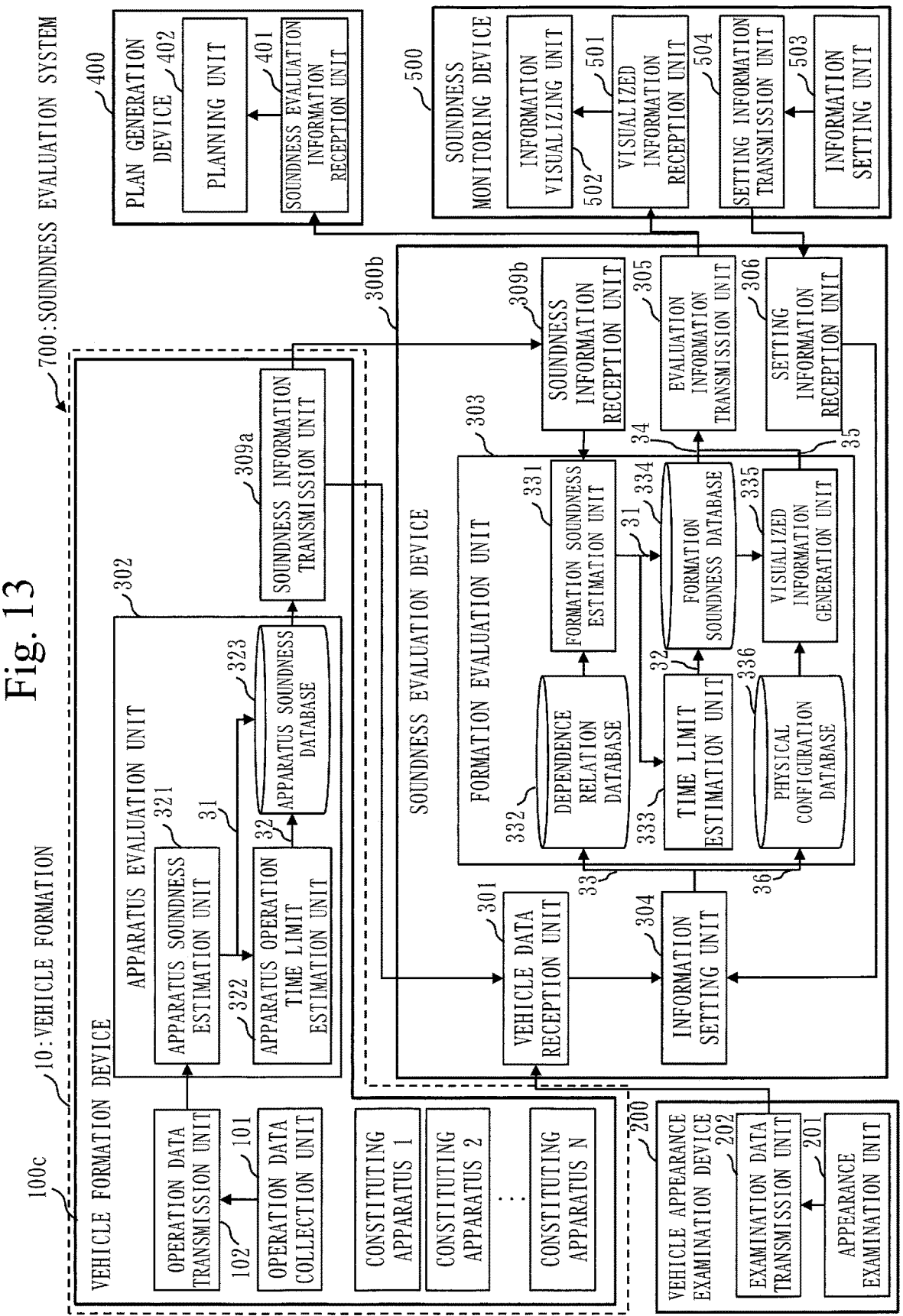
FIG. 13 is a diagram illustrating a configuration example of a soundness evaluation system according to a third embodiment.

FIG. 13 is a diagram illustrating a configuration example of the soundness evaluation system 700 according to the present embodiment.

The soundness evaluation system 700 according to the present embodiment is constituted by a vehicle formation device 100c, the vehicle appearance examination device 200, the soundness evaluation device 300b, the plan generation device 400 and the soundness monitoring device 500.

The vehicle formation device 100c is a computer mounted on the vehicle formation 10. The vehicle formation device 100c includes a plurality of constituting apparatuses 11 that constitute the vehicle formation 10, the operation data transmission unit 102, the apparatus evaluation unit 302 and a soundness information transmission unit 309a.

The operation data transmission unit 102 outputs apparatus operation data to the apparatus evaluation unit 302.

Further, the soundness information transmission unit 309a transmits soundness evaluation information of constituting apparatuses generated by the apparatus evaluation unit 302 to the soundness evaluation device 300b. Furthermore, the soundness information transmission unit 309a transmits information of dependence relations and physical configuration of the constituting apparatuses to the soundness evaluation device 300b.

The basic functions of the operation data transmission unit 102 and the apparatus evaluation unit 302 are similar to those described in the first embodiment.

Figure 14:
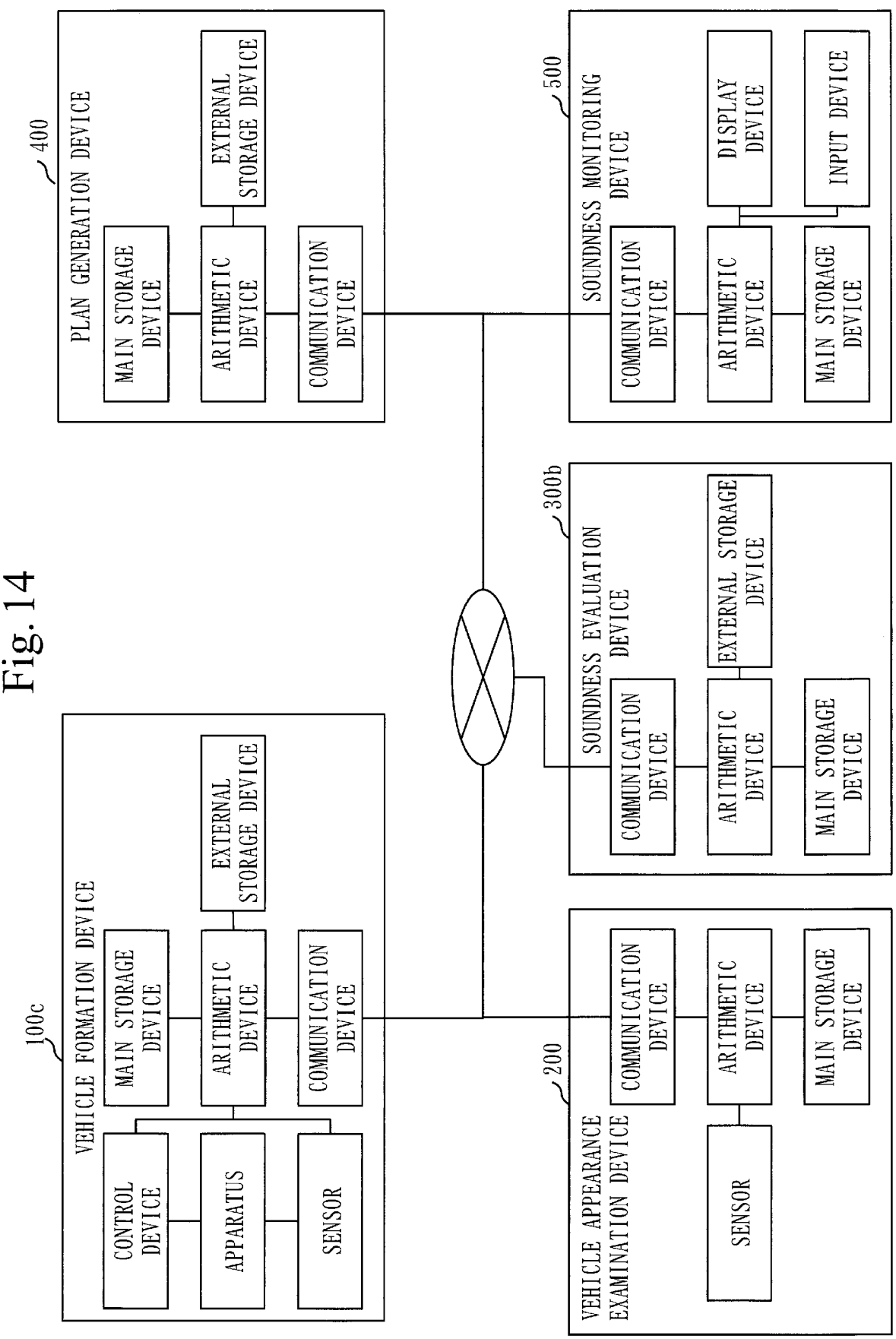
FIG. 14 is a diagram illustrating an example of a hardware configuration of the soundness evaluation system according to the third embodiment.

FIG. 14 is a diagram illustrating an example of a hardware configuration o the soundness evaluation system 700 according to the present embodiment.

The hardware configuration of the soundness evaluation system 700 is constituted by the vehicle formation device 100c, the vehicle appearance examination device 200, the soundness evaluation device 300b, the plan generation device 400 and the soundness monitoring device 500.

The soundness evaluation device 300b and the plan generation device 400 may be configured on an on-premise server or a cloud.

The vehicle appearance examination device 200, the plan generation device 400 and the soundness monitoring device 500 are similar to those in the first embodiment. Further, the soundness evaluation device 300b is similar to that in the second embodiment.

The vehicle formation device 100c includes a constituting apparatus to constitute a vehicle formation being an evaluation target, a control device to control operations of each constituting apparatus, and a sensor to sense operation conditions of each constituting apparatus. Further, the vehicle formation device 100c includes an arithmetic device to perform soundness evaluation of the constituting apparatus, and a main storage device to temporarily store various types of intermediate data in the arithmetic device or soundness evaluation information of the constituting apparatus that has been generated. Furthermore, the vehicle formation device 100c includes an external storage device to store the soundness evaluation information of the constituting apparatus that has been generated and a communication device to transmit the soundness evaluation information of the constituting apparatus generated.

Each operation of the present embodiment is similar to that in the first and second embodiments.

By making a configuration as in the present embodiment, it is possible to make soundness evaluation of individual apparatus be performed as edge processing, and to reduce the processing load on the server side. Further, by feeding back the soundness evaluation result of individual apparatus in real time to a control device such as a train control and management system (TCMS) to control the entire vehicle formation, for example, dynamic operation decision in accordance with soundness conditions of apparatuses becomes possible.

In the first to third embodiments, each unit of each device of the soundness evaluation system has been described as an independent functional block. However, the configuration of each device of the soundness evaluation system may not be the configuration as described in the embodiments above. The functional block of each device of the soundness evaluation system may have any configuration as long as the functions described in the embodiments above can be realized. Further, each device of the soundness evaluation system may be a system constituted by a plurality of devices instead of one device.

In addition, a plurality of parts of the first through third embodiments may be combined and implemented. Alternatively, one part of these embodiments may be implemented. In addition, these embodiments may be combined and implemented, as a whole or partially, in any combinations.

That is, in the first through third embodiments, it is possible to freely combine each embodiment, modify any components of each embodiment, or omit any components in each embodiment.

The embodiments as described above are essentially preferred examples, which are not intended to limit the scope of the present disclosure, the scope of application of the present disclosure, and the scope of use of the present disclosure. The embodiments as described above can be variously modified as needed.

REFERENCE SIGNS LIST

10: vehicle formation; 11: constituting apparatus; 20: evaluation target apparatus; 21: dependency destination apparatus; 31: soundness estimation value; 32: operation time limit; 33: dependence relation information; 34: soundness evaluation information; 35: visualized information; 36: physical configuration information; 38: examination time limit; 100, 100c: vehicle formation device; 101: operation data collection unit; 102: operation data transmission unit; 200: vehicle appearance examination device; 201: appearance examination unit; 202: examination data transmission unit; 300, 300a, 300b: soundness evaluation device; 301: vehicle data reception unit; 302: apparatus evaluation unit; 303: formation evaluation unit; 304: information setting unit; 305: evaluation information transmission unit; 306: setting information reception unit; 309a: soundness information transmission unit; 309b: soundness information reception unit; 321: apparatus soundness estimation unit; 322: apparatus operation time limit estimation unit; 323: apparatus soundness database; 331: formation soundness estimation unit; 332: dependence relation database; 333: time limit estimation unit; 334: formation soundness database; 335: visualized information generation unit; 336: physical configuration database; 400: plan generation device; 401: soundness evaluation information reception unit; 402: planning unit; 500: soundness monitoring device; 501: visualized information reception unit; 502: information visualizing unit; 503: information setting unit; 504: setting information transmission unit; 700: soundness evaluation system

The invention claimed is:

1. A condition evaluation device to evaluate a condition of a multi-car vehicle comprised of a plurality of apparatuses, the condition evaluation device comprising a processing circuitry programmed to execute software modules comprising:
    a vehicle data reception module to acquire information for apparatus condition evaluation, for each apparatus, comprised of operation data sensed by an in-vehicle sensor or appearance examination data obtained by an external-appearance sensor;
    an information setting module to store, within a dependence relation database, dependence relation information in the form of a directed graph whose edges represent dependence relations between the plurality of apparatuses, wherein importance degrees are assigned to the respective edges representing intensities of the dependence relations, wherein the multi-car vehicle is represented as a vertex in the directed graph;
    an apparatus evaluation module comprising:
        an apparatus condition estimation module to calculate, based on the information for apparatus condition evaluation acquired by the sensors:
            a condition estimation value to represent a condition with respect to each of terminal apparatuses, which are apparatuses among the plurality of apparatuses whose operation state does not depend on any other one of the plurality of apparatuses according to the acquired dependence relation information; and
            a condition estimation value to represent a condition with respect to each of the apparatuses other than the terminal apparatuses among the plurality of apparatuses, and
        an apparatus condition database to store the condition estimation value calculated for each of the terminal apparatuses and the other apparatuses among the plurality of apparatuses;
    a multi-car vehicle evaluation module comprising:
        the dependence relation database, and
        a multi-car vehicle condition estimation module:
            to extract the directed graph from the dependence relation database;
            to determine, based on the detected graph, which of the plurality of apparatuses are terminal apparatuses and which are apparatuses other than the terminal apparatuses;
            to designate each of the apparatuses other than the terminal apparatus an evaluation target apparatus, and calculate a condition estimation value of each evaluation target apparatus using:
                the condition estimation value stored in the apparatus condition database for the evaluation target apparatus,
                the condition estimation value stored in the apparatus condition databased for each terminal apparatus and each other apparatus to which the evaluation target apparatus has a dependence relation according to the directed graph, and
                the importance degrees assigned to the respective dependence relations that the evaluation target apparatus has according to the directed graph; and
            when calculation of the condition estimation value is completed with respect to each of the designated evaluation target apparatuses of which the multi-car vehicle is comprised, to calculate a condition estimation value of the multi-car vehicle,
    wherein the multi-car vehicle condition estimation module designates the apparatuses other than the terminal apparatuses as the evaluation target apparatus in an order such that a given apparatus is designated the evaluation target apparatus before each of the apparatuses having a dependence relation on the given apparatus.

2. The condition soundness evaluation device as defined in claim 1, wherein
    for each of dependency destination apparatuses, which are apparatuses among the plurality of apparatuses with which the evaluation target apparatus has a dependence relation according to the directed graph, the multi-car vehicle estimation module acquires a condition estimation value of the dependency destination apparatus from the apparatus condition database, and multiplies the condition estimation value of the dependency destination apparatus by the importance degree of the dependence relation between the evaluation target apparatus and the dependency destination apparatus, and the multi-car vehicle estimation module performs an addition operation of adding together the values obtained by multiplying the respective condition estimation values of the dependency destination apparatuses by the corresponding importance degrees, and assigns the value obtained by the addition operation as the condition estimation value of the evaluation target apparatus.

3. The condition evaluation device as defined in claim 2, wherein the apparatus condition estimation module calculates an operation time limit of each terminal apparatus based on the condition estimation value of the terminal apparatus, and stores the condition estimation value and the operation time limit of the terminal apparatus in an apparatus condition database, and the multi-car vehicle estimation module calculates an operation time limit of the evaluation target apparatus based on the dependence relation information, and an operation time limit of each of the plurality of apparatuses with which the evaluation target apparatus has a dependence relation according to the directed graph and stores the condition estimation value and the operation time limit of the evaluation target apparatus in a condition database.

4. The condition evaluation device as defined in claim 1, wherein when the condition estimation value and an operation time limit are calculated with respect to the multi-car vehicle, the processing circuitry calculates an examination time limit to represent a time limit of examination for each of the multi-car vehicle and the respective apparatuses among the plurality of apparatuses, based on an operation time limit of each apparatus among the plurality of apparatuses, the processing circuitry being programmed to execute a visualized information generation module to generate visualized information to visualize a condition and the time limit of each of the multi-car vehicle formation and the respective apparatuses among of the plurality of apparatuses.

5. The condition evaluation device as defined in claim 4, wherein the processing circuitry calculates, based on each examination time limit of the multi-car vehicle and the respective apparatuses among the plurality of apparatuses, a recommended examination time limit to recommend start of examination of each of the multi-car vehicle and the respective apparatuses among the plurality of apparatuses, and the visualized information generation module generates information to visualize each of the recommended examination time limit of the multi-car vehicle and the respective apparatuses among the plurality of apparatuses.

6. The condition evaluation device as defined in claim 5, wherein the visualized information generation module generates the visualized information to visualize the condition, the time limit and the recommended examination time limit of each of the multi-car vehicle and the respective apparatuses among the plurality of apparatuses as a time-series transition from the past to present, and further up to the future.

7. The condition evaluation device as defined in claim 1, wherein the information setting module constructs, in estimation of the condition of the multi-car vehicle, the dependence relation information for every point of view desired to be considered in evaluation of the condition, and evaluating the condition of the multi-car vehicle for each piece of the dependence relation information separately.

8. The condition evaluation device as defined in claim 1, wherein the information setting module sets, in estimation of the condition of the multi-car vehicle, an intermediate evaluation point to the dependence relation information virtually, and evaluating the condition of the multi-car vehicle with respect to one of the plurality of apparatuses having a redundant structure or in a multiplex system.

9. The condition evaluation device as defined in claim 1, wherein the information setting module sets, in estimation of the condition of the multi-car vehicle, an intermediate evaluation point based on a maintenance unit to the dependence relation information, from a point of view of a maintenance plan and execution, and performing evaluation.

10. The condition evaluation device as defined in claim 1, wherein the processing circuitry is further programmed to execute a setting information reception module to acquire information on the dependence relation and a physical configuration of the plurality of apparatuses, from a control device of the multi-car vehicle, and stores the information in a database.

11. The condition evaluation device as defined in claim 10, wherein the setting information reception module acquires information to correct or change the information on the dependence relation and the physical configuration of the plurality of apparatuses, and corrects or changes at least one of the dependence relation database and a physical configuration database.

12. A condition evaluation method used by a condition evaluation device to evaluate a condition of a multi-car vehicle comprised of a plurality of apparatuses, the condition evaluation method comprising:

acquiring, via a vehicle data reception software module executed by processing circuitry, information for apparatus condition evaluation, for each apparatus, comprised of operation data sensed by an in-vehicle sensor or appearance examination data obtained by an external-appearance sensor;

storing, by an information setting software module executed by the processing circuitry, within a dependence relation database, dependence relation information in the form of a directed graph whose edges represent dependence relations between the plurality of apparatuses, wherein importance degrees are assigned to the respective edges representing intensities of the dependence relations, wherein the multi-car vehicle is represented as a vertex in the directed graph:

calculating, via an apparatus condition estimation software module within an apparatus evaluation software module executed by the processing circuitry, and based on the information for apparatus condition evaluation acquired from the sensors:

a condition estimation value to represent a condition with respect to each of terminal apparatuses, which are apparatuses among the plurality of apparatuses whose operation state does not depend on any other one of the plurality of apparatuses according to the acquired dependence relation information; and a condition estimation value to represent a condition with respect to each of the apparatuses other than the terminal apparatuses among the plurality of apparatuses; and storing, via the apparatus condition estimation software module, the condition estimation value calculated for each of the terminal apparatuses and the other apparatuses among the plurality of apparatuses within an apparatus condition database of the apparatus evaluation software module;

extracting, via a multi-car condition estimation module of a multi-car evaluation software module executed by the processing circuitry, the directed graph from the dependence relation database that is part of the multi-car evaluation software module;

determining, via the multi-car condition estimation module, based on the directed graph, which of the plurality of apparatuses are terminal apparatuses and which are apparatuses other than the terminal apparatus; and designating each of the apparatuses other than the terminal apparatuses among the plurality of apparatuses as an evaluation target apparatus, and calculating a condition estimation value of each evaluation target apparatus using:

the condition estimation value stored in the apparatus condition database for the evaluation target apparatus, the condition estimation value stored in the apparatus condition database for each terminal apparatus and each other apparatus to which the evaluation target apparatus has a dependence relation according to the directed graph, and the importance degrees assigned to the respective dependence relations the evaluation target apparatus has according to the directed graph when calculation of the condition estimation value is completed with respect to each of the plurality of apparatuses of which the multi-car vehicle is comprised, calculating a condition estimation value of the multi-car vehicle via the multi-car vehicle condition estimation module, wherein the method designates the apparatuses other than the terminal apparatuses as the evaluation target apparatus in an order such that a given apparatus is designated the evaluation target apparatus before each of the apparatuses having a dependence relation on the given apparatus.

13. A non-transitory computer readable medium storing a condition evaluation program used for a condition evaluation device to evaluate a condition of a multi-car vehicle formation comprised of a plurality of apparatuses, the condition evaluation program making the condition evaluation device being a computer execute:

a vehicle data reception module to acquire information for apparatus condition evaluation, for each apparatus, comprised of operation data sensed by an in-vehicle sensor or appearance examination data obtained by an external-appearance sensor;

an information setting module to store, within a dependence relation database, dependence relation information in the form of a directed graph whose edges represent dependence relations between the plurality of apparatuses, wherein importance degrees are assigned to the respective edges representing intensities of the dependence relations, wherein the multi-car vehicle is represented as a vertex in the directed graph;

an apparatus evaluation module comprising:

an apparatus condition estimation module to calculate, based on the information for apparatus condition evaluation acquired by the sensors:

a condition estimation value to represent a condition with respect to each of terminal apparatuses, which are apparatuses among the plurality of apparatuses whose operation state does not depend on any other one of the plurality of constituting apparatuses according to the acquired dependence relation information; and a condition estimation value to represent a condition with respect to each of the apparatuses other than the terminal apparatuses among the plurality of apparatuses, and an apparatus condition database to store the condition estimation value calculated for each of the terminal apparatuses and the other apparatuses among the plurality of apparatuses;

a multi-car vehicle evaluation module comprising:

the dependence relation database, and a multi-car vehicle condition estimation module:

to extract the directed graph from the dependence relation database;

to determine, based on the detected graph, which of the plurality of apparatuses are terminal apparatuses and which are apparatuses other than the terminal apparatuses;

to designate each of the apparatuses other than the terminal apparatus an evaluation target apparatus, and calculate a condition estimation value of each evaluation target apparatus using:

the condition estimation value stored in the apparatus condition database for the evaluation target apparatus, the condition estimation value calculated for each terminal apparatus and each other apparatus to which the evaluation target apparatus has a dependence relation according to the directed graph, and the importance degrees assigned to the respective dependence relations the evaluation target apparatus has according to the directed graph; and when calculation of the condition estimation value completed with respect to each of the plurality of apparatuses of which the multi-car vehicle is comprised, to calculate a condition estimation value of the multi-car vehicle, wherein the multi-car vehicle condition estimation module designates the apparatuses other than the terminal apparatuses as the evaluation target apparatus in an order such that a given apparatus is designated the evaluation target apparatus before each of the apparatuses having a dependence relation on the given apparatus.

* * * * *